US012632289B2

(12) United States Patent
Xiang

(10) Patent No.: US 12,632,289 B2
(45) Date of Patent: May 19, 2026

(54) RESOURCE SCHEDULING METHOD AND ELECTRONIC DEVICE

(71) Applicant: Honor Device Co., Ltd., Shenzhen (CN)

(72) Inventor: Chao Xiang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 422 days.

(21) Appl. No.: 18/547,416

(22) PCT Filed: Jan. 4, 2023

(86) PCT No.: PCT/CN2023/070533
    § 371 (c)(1),
    (2) Date: Aug. 22, 2023

(87) PCT Pub. No.: WO2023/193497
    PCT Pub. Date: Oct. 12, 2023

(65) Prior Publication Data
    US 2025/0013490 A1 Jan. 9, 2025

(30) Foreign Application Priority Data
    Apr. 7, 2022 (CN) .......................... 202210361743.6

(51) Int. Cl.
    *G06F 9/48* (2006.01)
(52) U.S. Cl.
    CPC .......... *G06F 9/4818* (2013.01); *G06F 9/4893* (2013.01)

(58) Field of Classification Search
    CPC ............................. G06F 9/4818; G06F 9/4893
    USPC .......................................................... 718/102
    See application file for complete search history.

(56) References Cited

U.S. PATENT DOCUMENTS

| | | | | |
|---|---|---|---|---|
| 9,547,353 B1 * | 1/2017 | Marr | ..................... | G06F 1/3206 |
| 10,133,597 B2 | 11/2018 | Tian et al. | | |
| 10,163,247 B2 * | 12/2018 | Collet Romea | ......... | G06T 15/00 |
| 10,649,519 B2 | 5/2020 | Goda et al. | | |
| 2016/0274636 A1 * | 9/2016 | Kim | ........................ | G06F 1/329 |
| 2017/0018111 A1 | 1/2017 | Collet Romea et al. | | |
| 2021/0026688 A1 | 1/2021 | Cheng | | |

(Continued)

FOREIGN PATENT DOCUMENTS

| | | |
|---|---|---|
| CN | 102073545 A | 5/2011 |
| CN | 105045367 A | 11/2015 |

(Continued)

OTHER PUBLICATIONS

Glenn A. Elliott, Bryan C. Ward, and James H. Anderson, "GPUSync: A Framework for Real-Time GPU Management", 2013 IEEE 34th Real-Time Systems Symposium (Year: 2013).*

(Continued)

*Primary Examiner* — Patricia H Munson
(74) *Attorney, Agent, or Firm* — Slater Matsil, LLP

(57) ABSTRACT

Some embodiments of this application provide a resource scheduling method and an electronic device, and relate to the field of power electronic technology. The method includes: —displaying a first window in response to a first operation of a user, wherein the first window corresponds to a first process; adjusting a process priority and an I/O priority of the first process and power consumption of a CPU based on a first scheduling policy or a second scheduling policy.

18 Claims, 14 Drawing Sheets

(56) References Cited

U.S. PATENT DOCUMENTS

| | | | |
|---|---|---|---|
| 2021/0232201 A1 | 7/2021 | Chen et al. | |
| 2021/0406092 A1* | 12/2021 | De Paula Rosa Piga | ................... G06F 9/5027 |
| 2023/0024130 A1* | 1/2023 | Acharya | ............... G06F 9/5077 |
| 2023/0305890 A1* | 9/2023 | Gumienny | ............ G06F 9/5016 |
| 2025/0321846 A1* | 10/2025 | Narayanaswamy | ......................... G06F 11/3024 |

FOREIGN PATENT DOCUMENTS

| | | | | |
|---|---|---|---|---|
| CN | 106095592 A | 11/2016 | | |
| CN | 106412336 A | 2/2017 | | |
| CN | 106663021 A | 5/2017 | | |
| CN | 107577533 A | 1/2018 | | |
| CN | 107861603 A | 3/2018 | | |
| CN | 109684090 A | 4/2019 | | |
| CN | 110489228 A | 11/2019 | | |
| CN | 111414265 A | 7/2020 | | |
| CN | 111796933 A | * 10/2020 | ........... G06F 9/5027 | |
| CN | 113641488 A | 11/2021 | | |
| CN | 114443256 A | 5/2022 | | |
| EP | 3848776 A1 | 7/2021 | | |
| WO | 2019085840 A1 | 5/2019 | | |

OTHER PUBLICATIONS

Rawas, Soha, "Energy, network, and application-aware virtual machine placement model in SDN-enabled large scale cloud data centers," Multimedia Tools and Applications, Feb. 4, 2021, 23 pages.

Krzywda, Jacob et al., "Power Shepherd: Application Performance Aware Power Shifting," 2019 IEEE International Conference on Cloud Computing Technology and Science (CloudCom), Dec. 11, 2019, 9 Pages.

Ma, Shuangke et al., "Scheduling Strategy of IO and Network Intensive Applications Based on the Priority in Cloud Environment", School of Computer Science and Information Engineering; May 15, 2017; 6 pages. English abstract only.

\* cited by examiner

RESOURCE SCHEDULING METHOD AND ELECTRONIC DEVICE

CROSS-REFERENCE TO RELATED APPLICATIONS

This application is a national stage of International Application No. PCT/CN2023/070533, filed on Jan. 4, 2023, which claims priority to Chinese Patent Application No. 202210361743.6, filed on Apr. 7, 2022, both of which are incorporated herein by references in their entireties.

TECHNICAL FIELD

This application relates to the field of power electronic technology, and in particular, to a resource scheduling method and an electronic device.

BACKGROUND

With the enhancement of the performance of terminal devices, the power consumption of a terminal device is increasingly higher. However, the increase of battery capacity is very slow, thereby making the battery endurance of the terminal device unable to meet user requirements and impairing the user experience in a mobile scenario. Therefore, resource scheduling needs to be performed more accurately for a current task based on load status of tasks currently performed by the terminal device, so as to provide a long battery endurance in a mobile scenario while ensuring high performance of the terminal device.

In a conventional resource scheduling scheme, the terminal device counts the load value of all current tasks within a period of time, and then performs resource scheduling for all current tasks based on the resultant load value. For example, if the load value of all current tasks is relatively large, the power of a central processing unit (central processing unit, CPU) may be increased. The conventional resource scheduling scheme is unable to perform dynamic resource scheduling based on a particular application scenario of the user, thereby making the CPU run in a high-performance state in most user scenarios, and resulting in a waste of resources and excessive energy consumption.

SUMMARY

Some embodiments of this application provide a resource scheduling method and an electronic device, and can reduce energy consumption of the electronic device while smoothly meeting user requirements.

To achieve the foregoing objective, the following technical solutions are used in some embodiments of this application.

According to a first aspect, this application provides a resource scheduling method. The method is applied to an electronic device that includes a CPU and a GPU. The method includes: displaying, by the electronic device, a first window in response to a first operation of a user, where the first window is a focused window; and obtaining process information of a first process corresponding to the first window as well as first information, where the first information includes at least one of: GPU usage information of the first process, a peripheral event, or power mode information; determining a user scenario of the electronic device based on the process information of the first process and the first information; obtaining a system load and a chip platform type of the CPU; obtaining a first scheduling policy based on the system load and the user scenario, where the first scheduling policy includes an OS scheduling policy and a CPU power consumption scheduling policy; adjusting a process priority and an input/output I/O priority of the first process based on the OS scheduling policy; and adjusting power consumption of the CPU based on the CPU power consumption scheduling policy.

In the method according to an embodiment of this application, when it is determined that the first operation changes the focused window into the first window (that is, the focused window is changed), the user scenario of the electronic device is determined based on the process information of the first process, the GPU usage information of the first process, the peripheral event, the power mode information, and the like. The user scenario may include: a video playing scenario and a video browse scenario under the category of the video scenario; and a document browse scenario, a document edit scenario, and a videoconference scenario under the category of the office scenario, and the like. To be specific, the actual needs of the user in a process of using the electronic device are determined, and then a first scheduling policy is obtained based on the actual needs (that is, the user scenario) of the user and the actual running status (that is, the system load) of the electronic device, thereby obtaining an OS scheduling policy and a CPU power consumption scheduling policy. The OS scheduling policy enables the first process to preemptively occupy a CPU resource and perform I/O access, so as to ensure smooth running of the first process. The CPU power consumption scheduling policy is intended to reduce the power consumption of the CPU. In this way, on the basis of ensuring that the performance of the terminal device can smoothly meet user requirements, the energy consumption of the electronic device is reduced, and the durability of the electronic device is enhanced.

In a possible design of the first aspect, the obtaining a first scheduling policy based on the system load and the user scenario includes: determining a second scheduling policy based on the user scenario, where the second scheduling policy includes: a first process priority and a first input/output I/O priority of the first process, and a first long-duration turbo boost power limit PL1, a first short-duration turbo boost power limit PL2, and a first energy efficiency preference EPP value of the CPU; and obtaining the first scheduling policy based on the system load, the user scenario, and the second scheduling policy. The first scheduling policy includes at least: a second process priority and a second I/O priority of the first process; and a second PL1, a second PL2, and a second EPP value of the CPU. When the system load is greater than a preset first value, the second process priority is higher than or equal to the first process priority, the second I/O priority is higher than or equal to the first I/O priority, the second PL1 is greater than the first PL1, the second PL2 is greater than the second PL2, and the second EPP value is less than the first EPP value.

Understandably, the higher the load, the higher the process priority and I/O priority of the first process. The higher priority ensures that the first process can preemptively occupy CPU resources and perform I/O access, thereby ensuring smooth running of the first process. In addition, when the load increases, the PL1 and the PL2 are increased appropriately, and the EPP value is reduced appropriately to achieve a trade-off between the performance and power consumption of the electronic device.

In a possible design of the first aspect, the method further includes: determining a chip platform type of the CPU. The chip platform type includes a first type and a second type.

The first type of CPU may be an AMD® CPU chip, and the second type of CPU may be an Intel® CPU chip.

In a possible design of the first aspect, the CPU power consumption scheduling policy includes a first sub-policy and a second sub-policy. The second sub-policy is a Dynamic Tuning Technology DTT policy determined based on the first sub-policy. The adjusting power consumption of the CPU based on the CPU power consumption scheduling policy includes: adjusting the power consumption of the CPU based on the first sub-policy when the chip platform type is the first type; and adjusting the power consumption of the CPU based on the second sub-policy when the chip platform type is the second type. In other words, for a AMD® CPU and an Intel® CPU, this application can adaptively provide a matching power consumption scheduling policy.

In a possible design of the first aspect, the GPU usage information of the first process includes a GPU usage of the first process and a GPU engine. The determining a user scenario of the electronic device based on the process information of the first process and the first information includes:

determining a type of the first process based on the process information; and determining that the user scenario of the electronic device is a video playing scenario when the type of the first process is video, the GPU usage of the first process is greater than 0, and the GPU engine is a GPU video process engine, where, understandably, if the type of the first process is video, it can be firstly determined that the user is currently using a video application; if the GPU usage of the first process is greater than 0, it indicates that the first process occupies some GPU resources during running; if the GPU engine of the first process is a GPU video processing (video process) engine, it indicates that the first process uses the GPU to perform a decoding operation during running; in this way, it can be determined that the user is probably using the electronic device for playing a video; that is, the user scenario of the electronic device is a video playing scenario; and determining that the user scenario of the electronic device is a video browse scenario when the type of the first process is video, the GPU usage of the first process is greater than 0, and the GPU engine is a GPU 3D engine. In this step, correspondingly, if the GPU engine of the first process is a GPU 3D engine, it indicates that the first process is just performing a 2D or 3D rendering operation by use of the GPU, and it can be inferred that the user is browsing a video resource instead of playing a video by use of the electronic device. That is, the user scenario of the electronic device is a video browse scenario.

In a possible design of the first aspect, the method further includes: determining that the user scenario of the electronic device is a game scene when the type of the first process is game, the power mode is a game mode, the GPU usage of the first process is greater than 0, and the GPU engine is a GPU 3D engine.

Understandably, if the type of the first process is game, it can be firstly determined that the user is currently using a game application. If the GPU usage of the first process is greater than 0, it indicates that the first process occupies some GPU resources during running. If the GPU engine of the first process is a GPU 3D engine, it indicates that the first process is performing a 2D or 3D rendering operation by use of the GPU. In this way, it can be determined that the user is probably using the electronic device for playing a game. That is, the user scenario of the electronic device is a game scene.

In a possible design of the first aspect, the peripheral event includes one or more of a keyboard input event, a mouse input event, a microphone input event, or a camera input event. The determining a user scenario of the electronic device based on the process information and the first information includes: determining a type of the first process based on the process information;

determining that the user scenario of the electronic device is a text chat scenario when the type of the first process is social and the keyboard input event is detected, where, specifically, if it is detected that the user is using a social app while inputting a text, the user is probably chatting by use of the social app, and it can be determined that the user scenario of the electronic device is a text chat scenario;

determining that the user scenario of the electronic device is a voice chat scenario when the type of the first process is social, the microphone input event is detected, and no camera input event is detected, where, specifically, if it is detected that the user is using a social app while inputting a voice, the user is probably voice-chatting by use of the social app, and it can be determined that the user scenario of the electronic device is a voice chat scenario; and determining that the user scenario of the electronic device is a video chat scenario when the type of the first process is social and both the microphone input event and the camera input event are detected, where, specifically, if it is detected that the user is using a social app while inputting a video, the user is probably video-chatting by use of the social app, and it can be determined that the user scenario of the electronic device is a video chat scenario.

In a possible design of the first aspect, the method further includes:

determining that the user scenario of the electronic device is a document edit scenario when the type of the first process is office and the keyboard input event is detected, where, if it is detected that the user is using an office app while inputting a text, the user is probably editing a document by use of the office app, and it can be determined that the user scenario of the electronic device is a document edit scenario;

determining that the user scenario of the electronic device is a document browse scenario when the type of the first process is office, the mouse input event is detected, and no keyboard input event is detected, where, specifically, if it is detected that the user is using a mouse but without using a keyboard during use of an office app, the user is probably browsing a document by use of the office app, and it can be determined that the user scenario of the electronic device is a document browse scenario; and determining that the user scenario of the electronic device is a videoconference scenario when the type of the first process is office and both the microphone input event and the camera input event are detected, where, specifically, if it is detected that the user is using a camera during use of an office app, the user is probably attending a videoconference by use of the office app, and it can be determined that the user scenario of the electronic device is a videoconference scenario.

In a possible design of the first aspect, the electronic device further includes a scenario recognition engine, an operating system event driver OsEventDriver node, and a process manager, and the method further includes: sending, by the scenario recognition engine, a first request to the OsEventDriver node; sending, by the OsEventDriver node, the first request to the process manager; sending, by the process manager, process information of a second process to the OsEventDriver node in response to the first request after creating the second process; and sending, by the OsEventDriver node, the process information of the second process to the scenario recognition engine.

In a possible design of the first aspect, the electronic device further includes a scenario recognition engine and an API module, and the method further includes: sending, by the scenario recognition engine, a second request to the API module; and sending, by the API module, the process information of the first process to the scenario recognition engine in response to the second request after detecting a change of the focused window.

In a possible design of the first aspect, the electronic device further includes a scenario recognition engine, an OsEventDriver node, and a graphics card driver, and the method further includes: sending, by the scenario recognition engine, a third request to the OsEventDriver node; sending, by the OsEventDriver node, the third request to the graphics card driver; reporting, by the graphics card driver, a GPU decoding event to the OsEventDriver node in response to the third request after detecting that the GPU is performing a decoding operation; and sending, by the OsEventDriver node, the GPU decoding event to the scenario recognition engine.

In a possible design of the first aspect, the electronic device further includes a scenario recognition engine, an OsEventDriver node, and a peripheral driver, and the method further includes: sending, by the scenario recognition engine, a fourth request to the OsEventDriver node; sending, by the OsEventDriver node, the fourth request to the peripheral driver; and reporting, by the peripheral driver, a peripheral event to the OsEventDriver node in response to the fourth request after detecting a peripheral operation; and sending, by the OsEventDriver node, the peripheral event to the scenario recognition engine.

In a possible design of the first aspect, the method includes: obtaining, by the API module, a name of the first process and a name of the second process in response to the first operation of the user, where the second process is a process corresponding to a historical focused window; and sending the process information of the first process to the scenario recognition engine when the name of the first process is inconsistent with the name of the second process.

In a possible design of the first aspect, the determining a user scenario of the electronic device based on the process information and the first information includes: determining, by the scenario recognition engine, the user scenario of the electronic device based on the process information and the first information.

In a possible design of the first aspect, the electronic device further includes a scheduling engine, and the obtaining a scheduling policy based on the system load and the user scenario includes: determining, by the scenario recognition engine, a second scheduling policy based on the user scenario; sending, by the scenario recognition engine, the second scheduling policy and the user scenario to the scheduling engine; sending, by the scheduling engine, a fifth request to the scenario recognition engine; obtaining, by the scenario recognition engine, the system load and sending the system load to the scheduling engine in response to the fifth request; and obtaining, by the scheduling engine, the first scheduling policy based on the system load, the user scenario, and the second scheduling policy.

In a possible design of the first aspect, the electronic device further includes a process manager and an I/O manager. The OS scheduling policy includes a second process priority and a second I/O priority of the first process. The adjusting a process priority and an input/output I/O priority of the first process based on the OS scheduling policy includes: sending, by the scheduling engine, a first instruction to the process manager, where the first instruction carries the second process priority of the first process; adjusting, by the process manager, the process priority of the first process to the second process priority in response to the received first instruction; sending, by the scheduling engine, a second instruction to the I/O manager, where the second instruction carries the second I/O priority of the first process; and adjusting, by the I/O manager, the I/O priority of the first process to the second I/O priority in response to the received second instruction.

In a possible design of the first aspect, the determining a chip platform type of the CPU includes: determining, by the scheduling engine, that the chip platform type of the CPU is the first type or the second type.

In a possible design of the first aspect, the electronic device further includes a power manager and an operating system to System on Chip OS2SOC driver node. The first sub-policy includes a second PL1, a second PL2, and a second EPP value of the CPU. The adjusting the power consumption of the CPU based on the first sub-policy includes: sending, by the scheduling engine, a third instruction to the OS2SOC driver node, where the third instruction carries the second PL1 and the second PL2 of the CPU; sending, by the OS2SOC driver node, the third instruction to the CPU; adjusting, by the CPU, a PL1 to the second PL1 and adjusting a PL2 to the second PL2 in response to the third instruction; sending, by the scheduling engine, a fourth instruction to the power manager, where the fourth instruction carries the second EPP value of the CPU; sending, by the power manager, the fourth instruction to the CPU; and adjusting, by the CPU, an EPP value to the second EPP value in response to the fourth instruction.

In a possible design of the first aspect, the electronic device further includes an Intel DTT driver, and the adjusting the power consumption of the CPU based on the second sub-policy includes: sending, by the scheduling engine, a fifth instruction to the Intel DTT driver, where the fifth instruction carries the second sub-policy; sending, by the Intel DTT driver, the fifth instruction to the CPU; and running, by the CPU, based on the second sub-policy in response to the fifth instruction.

According to a second aspect, this application provides an electronic device. The electronic device includes a memory and one or more processors. The memory is configured to store computer program code. The computer program code includes a computer instruction. When executed by the processor, the computer instruction causes the electronic device to perform the method according to any one of the possible designs of the first aspect.

According to a third aspect, this application provides a computer-readable storage medium. The computer-readable storage medium includes a computer instruction. When run on an electronic device (such as a computer), the computer instruction causes the electronic device to perform the method according to the first aspect or any possible design of the first aspect.

According to a fourth aspect, this application provides a computer program product. When run on a computer, the computer program product causes the computer to perform the method according to the first aspect or any possible design of the first aspect.

According to a fifth aspect, this application provides a chip system. The chip system includes one or more interface circuits and one or more processors. The interface circuit and the processor are interconnected by a line. The chip system may be applied to an electronic device including a communications module and a memory. The interface circuit is configured to receive a signal from a memory of the electronic device and send the received signal to the processor. The signal includes a computer instruction stored in the memory. When the processor executes the computer instruction, the electronic device can perform the method according to the first aspect or any possible design of the first aspect.

Understandably, for beneficial effects that can be achieved by the electronic device according to the second aspect, the computer-readable storage medium according to the third aspect, the computer program product according to the fourth aspect, and the chip system according to the fifth aspect, reference may be made to the beneficial effects in the first aspect and any possible design of the first aspect, and details are omitted here.

DETAILED DESCRIPTION OF ILLUSTRATIVE EMBODIMENTS

Figure 1:
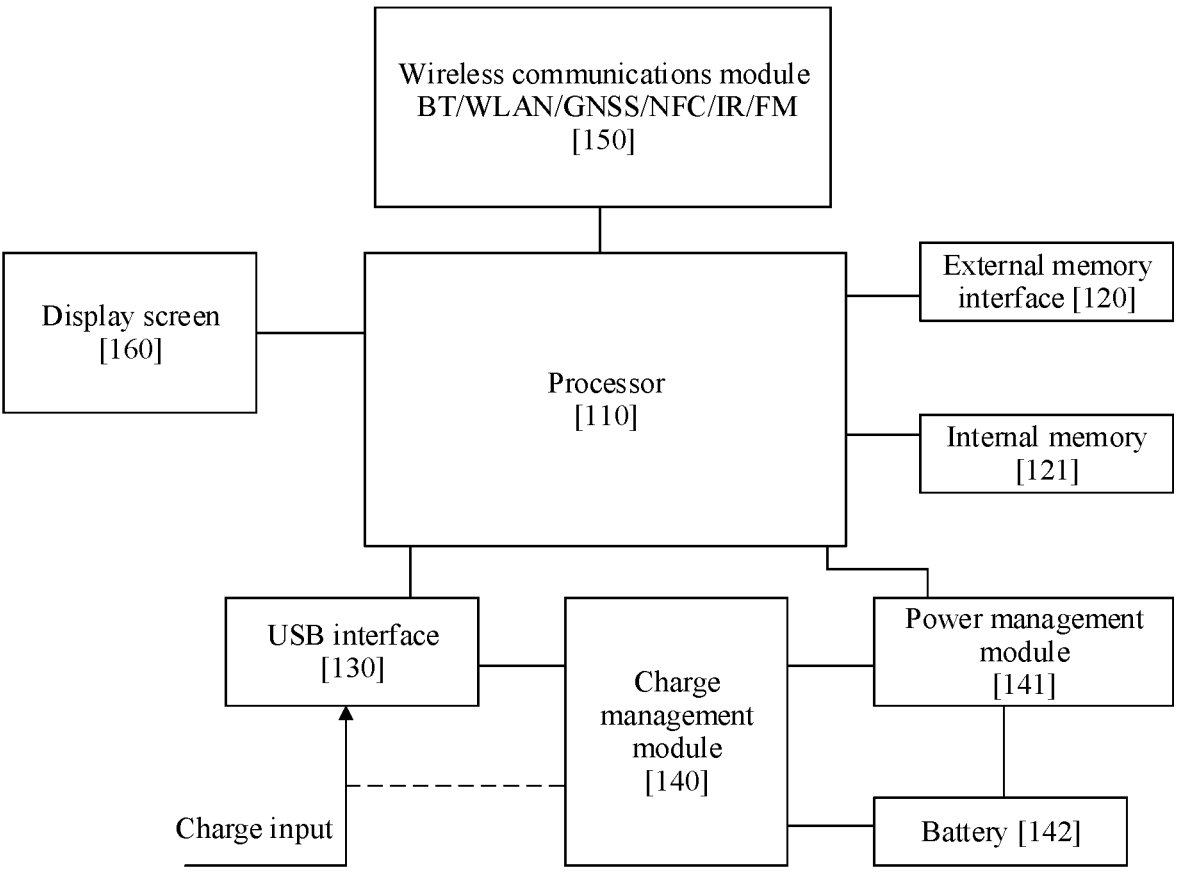
FIG. 1 is a schematic structural diagram of an electronic device according to an embodiment of this application.

The following terms "first" and "second" are merely used for description, and cannot be construed as indicating or implying relative importance or implicitly indicating a quantity of indicated technical features. Therefore, a feature defined with "first" or "second" may explicitly or implicitly include one or more of the features. In the descriptions of the embodiments, unless otherwise specified, "a plurality of" means two or more.

For clarity and brevity of the following embodiments, related concepts or technologies are briefly described first.

Focused window: refers to a window that is focused. The focused window is the only window that can receive a keyboard input. The way to determine the focused window is associated with a focus mode (focus mode) of the system. The top-level window of the focused window is called an active window (active window). Only one window is active at a time. The focused window is probably the window that the user currently needs to use.

The focus mode may be used for determining how the mouse brings a window into focus. There are three typical types of focus modes:

(1) Click-to-focus (click-to focus): In this mode, clicking on a window brings the window into focus. To be specific, clicking anywhere in a window to be focused activates the window and brings the window up to the front of all windows so that the window is ready for receiving a keyboard input. Clicking the mouse on another window makes window unfocused.

(2) Focus-follows-mouse (focus-follow-mouse): In this mode, the window in which the mouse cursor rests is focused. To be specific, when the cursor moves into the scope of a window to be focused, the user can activate the window and receive a keyboard input without clicking somewhere in the window, but the window is not necessarily brought up to the front of all windows. When the cursor moves out of the scope of this window, this window is unfocused accordingly.

(3) Sloppy focus (sloppy focus), similar to focus-follows-mouse: When the cursor moves into the scope of a window to be focused, the user can activate the window and receive a keyboard input without clicking somewhere in the window, but the window is not necessarily brought up to the front of all windows. Unlike focus-follows-mouse, when the cursor moves out of the scope of this window, the focus will not change accordingly. The system focus will change only when the cursor moves to another window to be focused.

A process includes a plurality of threads. A thread can create a window. A focused process is a process containing the thread that creates the focused window.

Long-duration turbo boost power limit (power limit1, PL1): means a power consumption limit of the CPU under a normal load, and is equivalent to a thermal design power consumption limit. The power consumption of the CPU in most of the operating time does not exceed PL1.

Short-duration turbo boost power limit (power limit2, PL2): means a power consumption limit that the CPU cannot exceed in a short duration, and is effective in the short duration only. Generally, PL2 is greater than PL1.

CPU energy performance preference (energy performance preference, EPP): reflects the scheduling preference of the CPU, with a value ranging from 0 to 255. The smaller the EPP value of the CPU, the higher performance of the CPU. The larger the EPP value of the CPU, the lower power consumption of the CPU.

This application provides a resource scheduling method, in which a kernel layer (kernel layer) node is provided. The node may report a focused window change event and first information (including process information of a focused process, status of occupying the GPU by the focused process, a peripheral event, a power mode, and the like) to an application layer. The application layer may determine the current user scenario of the electronic device based on the focused window change event and the first information, and determine a first scheduling policy based on the user scenario and the system load of the electronic device. The application layer adjusts a process priority, an I/O priority, and CPU power consumption of the focused process based on the first scheduling policy, thereby reducing the energy consumption of the electronic device while smoothly meeting user requirements (ensuring smooth running of the focused process).

FIG. 1 is a schematic structural diagram of an electronic device 100 according to an embodiment of this application.

As shown in FIG. 1, the electronic device 100 may include a processor 110, an external memory interface 120, an internal memory 121, a universal serial bus (universal serial bus, USB) interface 130, a charge management module 140, a power management module 141, a battery 142, a wireless communications module 150, a display screen 160, and the like.

Understandably, the structure shown in this embodiment does not constitute any specific limitation on the electronic device 100. In some other embodiments, the electronic device 100 may include more or fewer components than those shown in the drawing, or may be made of some of the components combined, divided, or differently arranged. The components in the drawing may be implemented by hardware, software or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be stand-alone devices or integrated into one or more processors.

The controller may be a nerve center and command center of the electronic device 100. The controller may generate an operation control signal according to an instruction operation code and a timing signal, to control instruction fetch and instruction execution.

The processor 110 may be further provided with a memory, configured to store instructions and data. In some embodiments, the memory in the processor 110 is a cache memory. The memory may store instructions or data last used or repeatedly used by the processor 110. When needing to use the instructions or the data again, the processor 110 may directly call the instructions or the data from the memory. This avoids repeated access, and reduces waiting time of the processor 110, thereby improving system efficiency.

In some embodiments, the processor 110 may include one or more interfaces. The interface may include an I²C interface, an inter-integrated circuit sound (inter-integrated circuit sound, I²S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a USB interface, and/or the like.

Understandably, an interface connection relationship between modules illustrated in this embodiment is merely illustrative, but does not constitute any limitation on a structure of the electronic device 100. In some other embodiments, the interface connection manner of the electronic device 100 may be different from that described in the foregoing embodiments, or may be a combination of a plurality of interface connection manners.

The charge management module 140 is configured to receive a charge input from a charger. The charger may be a wireless charger or may be a wired charger. The charge management module 140 may charge the battery 142 while the power management module 141 supplies power to the electronic device.

The power supply management module 141 is configured to connect the battery 142, the charge management module 140, and the processor 110. The power management module 141 receives an input of the battery 142 and/or the charge management module 140, and supplies power to the processor 110, the internal memory 121, an external memory, the display 160, the wireless communications module 150, and the like. In some embodiments, the power management module 141 and the charge management module 140 may be disposed in a same device instead.

The wireless communication module 150 may provide a wireless communication solutions applied to the electronic device 100, for example, WLAN (such as Wi-Fi), Bluetooth, Global Navigation Satellite System (global navigation satellite system, GNSS), Frequency Modulation (frequency modulation, FM), Near Field Communication (near field communication, NFC), and infrared technology (infrared, IR). For example, in an embodiment of this application, the electronic device 100 may establish a Bluetooth connection to the terminal device (for example, a wireless headset 100) through the wireless communications module 150.

The wireless communications module 150 may be one or more devices in which at least one communications processing module is integrated. The wireless communications module 150 receives an electromagnetic wave through an antenna, performs frequency modulation and filtering on the electromagnetic wave signal, and sends the filtered signal to the processor 110. The wireless communications module 150 may further receive a to-be-sent signal from the processor 110, perform frequency modulation on and amplify the signal, and radiates the signal after the signal is converted into an electromagnetic wave by the antenna.

The electronic device 100 implements a display function by using the GPU, the display screen 160, an application processor, and the like. The GPU is a graphics microprocessor connected to the display screen 160 and the application processor. The GPU is configured to perform mathematical and geometric calculation for graphic rendering. The processor 110 may include one or more GPUs to execute a program instruction to generate or change display information.

The display screen 160 is configured to display an image, a video, and the like. The display screen 160 includes a display panel.

The external memory interface 120 may be configured to be connected to an external memory card such as a Micro SD card to extend a storage capacity of the electronic device 100. The external memory card communicates with the processor 110 through the external memory interface 120 to implement a data storage function. For example, the external memory card stores music, videos, and other files.

The internal memory 121 may be configured to store computer-executable program code. The executable program code includes an instruction. The processor 110 executes various function applications and data processing of the electronic device 100 by running the instruction stored in the internal memory 121. For example, in an embodiment of this application, the processor 110 may execute an instruction stored in the internal memory 121, and the internal memory 121 may include a program storage region and a data storage region.

The program storage region may store an operating system, an app required for implementing at least one function (for example, an audio playing function and an image playing function), and the like. The data storage region may store data (for example, audio data, a phone book, or the like) created during use of the electronic device 100. In addition, the internal memory 121 may include a high-speed random access memory, and may further include a non-volatile memory, for example, at least one magnetic disk storage device, a flash memory device, and a universal flash storage (universal flash storage, UFS).

A software system of the electronic device 100 may assume a layered architecture, an event-driven architecture, a microkernel architecture, a microservice architecture, or a cloud architecture. In an embodiment of this application, a software structure of the electronic device 100 is described by using a layered Windows system as an example.

Figure 2:
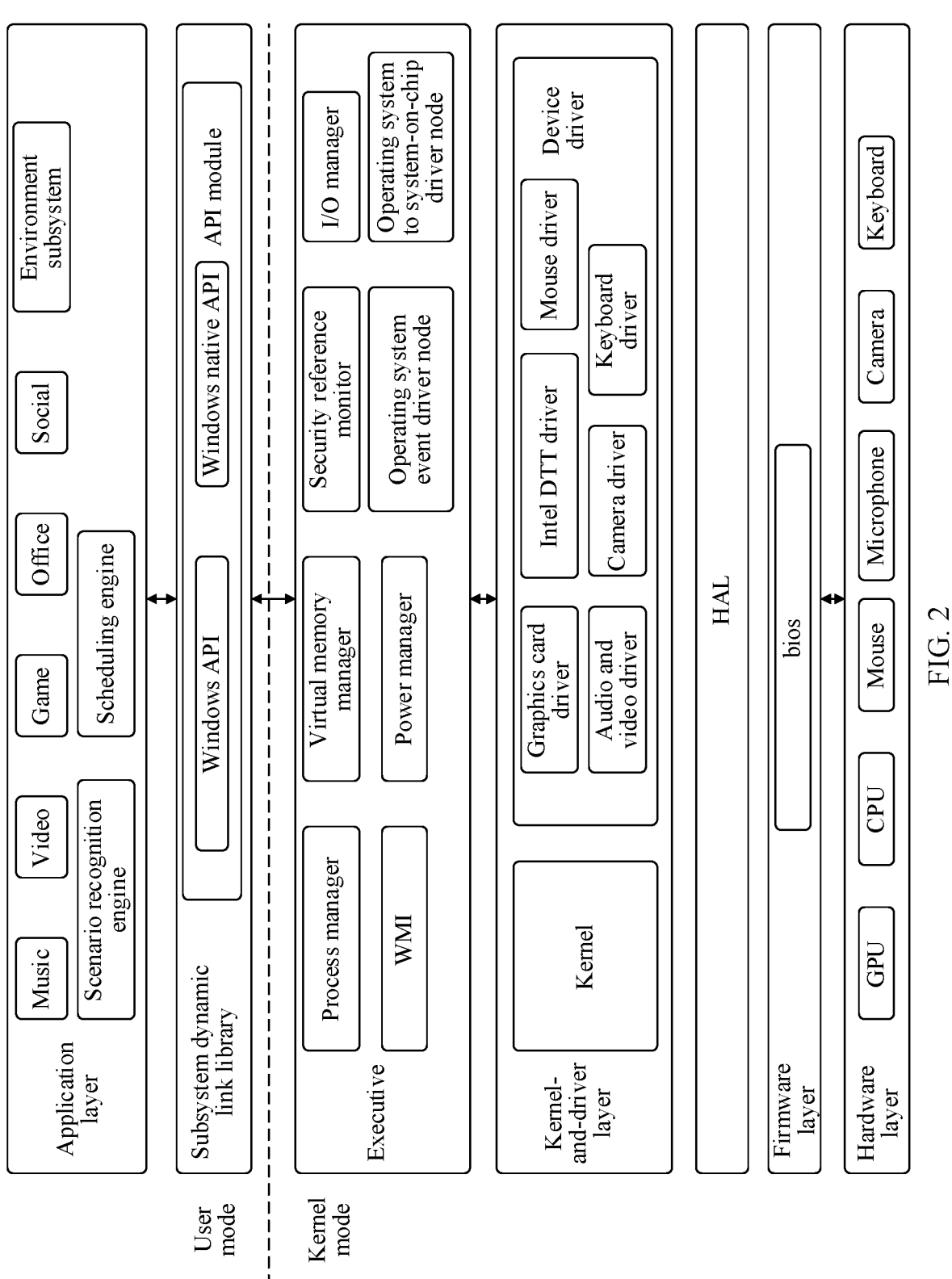
FIG. 2 is a schematic diagram of a software module architecture according to an embodiment of this application.

FIG. 2 is a block diagram of a software structure of the electronic device 100 according to an embodiment of this application.

In the layered architecture, software is divided into several layers, each layer playing a clearly defined role and function. Different layers communicate with each other through a software interface. In some embodiments, a process in a Windows operating system runs in a user mode or kernel mode. A user-mode architecture includes an application layer and a subsystem dynamic link library. A kernel-mode architecture is divided into a firmware layer, a hardware abstraction layer (hardware abstraction layer, HAL), a kernel-and-driver layer, and an executive from bottom to top.

As shown in FIG. 2, the application layer includes apps such as music, video, game, office, and social. The application layer further includes an environment subsystem, a scenario recognition engine, a scheduling engine, and the like. What is shown in the drawing is only a part of the applications. The application layer may further include other applications such as shopping app and browser, without being limited herein.

The environment subsystem may exhibit some subsets of basic executive system services to an application in a specified form, and provide an execution environment for the application.

The scenario recognition engine may recognize the user scenario of the electronic device 100, and determine a basic scheduling policy (also referred to as a second scheduling policy) that matches the user scenario. The scheduling engine may obtain the load status of the electronic device 100, and determine an actual scheduling policy (also referred to as a first scheduling policy) based on the load status of the electronic device 100 and the basic scheduling policy, where the actual scheduling policy is consistent with the actual running conditions of the electronic device 100. Details of the scenario recognition engine and the scheduling engine will be given herein later, and are omitted here.

The subsystem dynamic link library includes an API module. The API module includes a Windows API, a Windows native API, and the like. The Windows API and the Windows native API are both able to provide a system call entry and internal function support for an application, but differ in that the Windows native API is a native API of the Windows system. For example, Windows APIs may include user.dll, kernel.dll; and Windows native APIs may include ntdll.dll. Among such APIs, user.dll is a Windows user interface API available for performing operations such as creating a window and sending a message; kernel.dll is an API for an application to access the kernel; and ntdll.dll is an important Windows NT kernel-level file that describes a Windows native NTAPI. When Windows operating system is started up, ntdll.dll resides in a specific write-protected region of the memory, and prevents other programs from occupying the memory region.

The executive includes modules such as process manager, virtual memory manager, security reference monitor, I/O manager, Windows management instrumentation (Windows management instrumentation, WMI), power manager, operating system event driver (operating system event driver, OsEventDriver) node, and operating system to system-on-chip driver (operating system to System on Chip, OS2SOC) node.

The process manager is configured to create and abort a process and a thread.

The virtual memory manager implements "virtual memory". The virtual memory manager also provides basic support for the cache manager.

The security reference monitor implements a security policy on a local computer, protects operating system resources, and protects and monitor a runtime object.

The I/O manager performs device-independent input/output, further processes the input/output, and calls an appropriate device driver.

The power manager manages power status changes of all devices that support changing of power status.

The system event driver node interacts with the kernel-and-driver layer such as a graphics card driver, and reports a GPU video decoding event to the scenario recognition engine after determining occurrence of the GPU video decoding event.

The operating system to system-on-chip driver node is available for the scheduling engine to send an adjustment message to a hardware device, for example, to send a PL1 and PL2 adjustment message to the CPU.

The kernel-and-driver layer includes a kernel and a device driver.

The kernel is an abstraction of the processor architecture, and isolates the difference between the executive and the processor architecture to ensure portability of the system. The kernel performs thread arrangement and scheduling, trap handling, exception scheduling, interruption handling and scheduling, and the like.

The device driver runs in a kernel mode and serves as an interface between the I/O system and related hardware. The device driver may include a graphics card driver, an Intel DTT driver, a mouse driver, an audio and video driver, a camera driver, a keyboard driver, and the like. For example, the graphics card driver drives the GPU to run, and the Intel DTT driver drives the CPU to run.

The HAL is a kernel-mode module, and can hide various hardware-related details such as an I/O interface, an interrupt controller, and a multi-processor communication mechanism. The HAL provides a unified service interface for different hardware platforms that run the Windows system, and implements portability across diverse hardware platforms. It is to be noted that, in order to maintain the portability of Windows, the Windows internal components and user-written device drivers access the hardware not directly, but by calling a routine in the HAL.

The firmware layer may include a Basic Input Output System (basic input output system, BIOS). The BIOS is a set of programs solidified in a read-only memory (read only memory, ROM) chip on a computer mainboard. The BIOS stores the basic input output program, self-test program during power-on, and a system self-starting program that are most essential on the computer, and can read and write specific information of system settings from a complementary metal oxide semiconductor (complementary metal oxide semiconductor, CMOS). A main function of the BIOS is to provide the computer with the lowest-level and most direct hardware setting and control. The Intel DTT driver can send an instruction to the CPU through the BIOS.

It is to be noted that the Windows system is used as an example for description in this embodiment of this application. In another operating system (for example, an Android system or an IOS system), the solutions of this application can still be implemented as long as the functions implemented by the functional modules are similar to those implemented in this embodiment of this application.

Figure 3A:
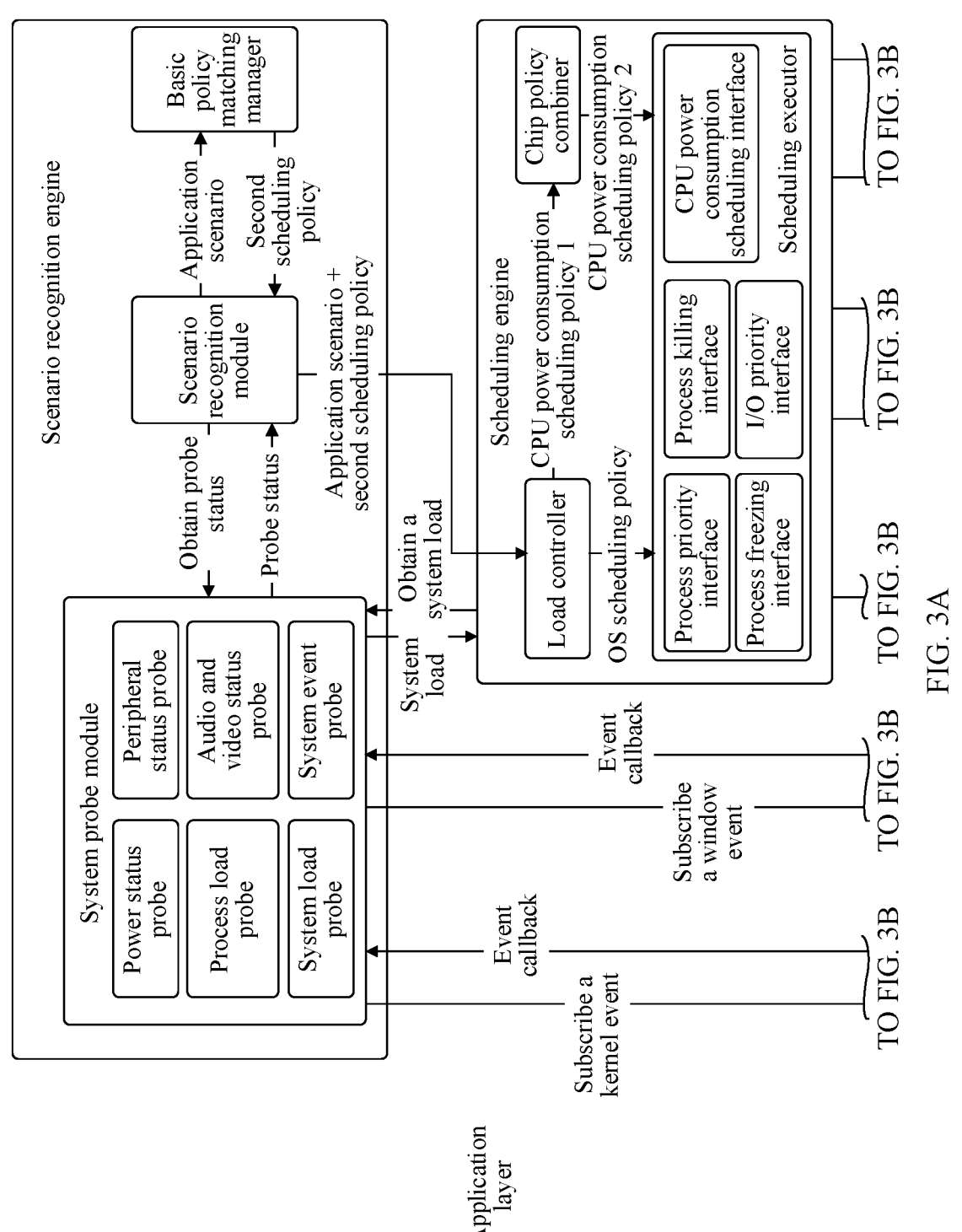
FIG. 3A and FIG. 3B are a schematic diagram of interaction between software modules according to an embodiment of this application.
Figure 3B:
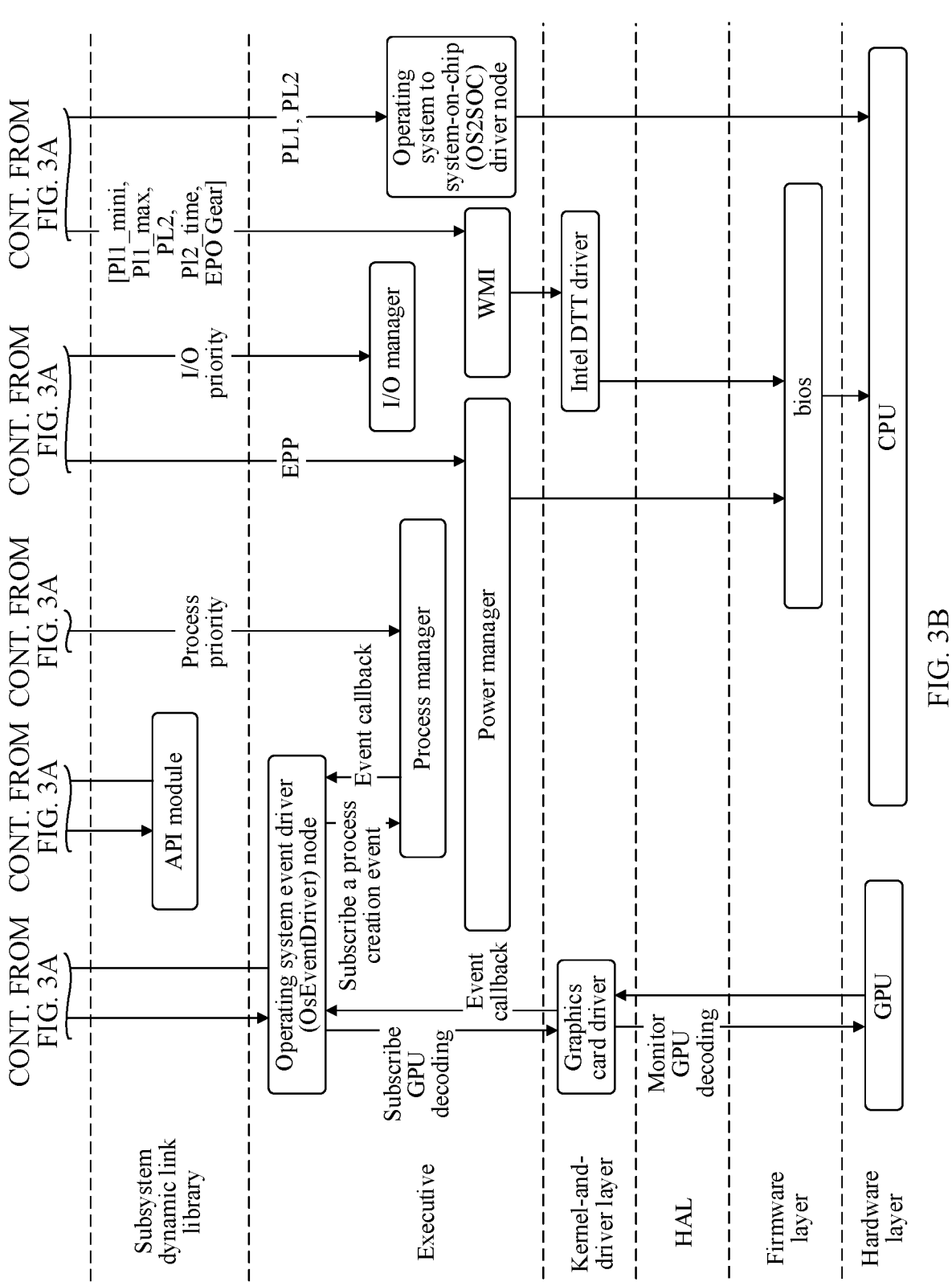

FIG. 3A and FIG. 3B are a schematic flowchart of resource scheduling software and hardware of the electronic device 100.

As shown in FIG. 3A and FIG. 3B, the scenario recognition engine of the application layer includes a system probe module, a scenario recognition module, and a basic policy matching manager. The scenario recognition module may interact with the system probe module and the basic policy matching manager separately. The scenario recognition module may send a request to the system probe module to obtain the probe status. The system probe module may obtain the running status of the electronic device 100. For example, the system probe module may include a power status probe, a peripheral device status probe, a process load probe, an audio and video status probe, a system load probe, and a system event probe.

The power status probe may subscribe a power status event from a kernel-mode module, and determine the power status based on a callback function fed back by the kernel-mode module. The power status includes (remaining) battery level, power mode, and the like. The power mode may include alternating current (alternating current, AC) power supply and direct current (direct current, DC) power supply. For example, the power status probe may send a request to the OsEventDriver node of the executive layer to subscribe the power status event. The OsEventDriver node forwards the request to the power manager of the executive layer. The power manager may feed back a callback function to the power status probe through the OsEventDriver node.

The peripheral status probe may subscribe a peripheral event from the kernel-mode module, and determine a peripheral event based on the callback function fed back by the kernel-mode module. Peripheral events include a mouse wheel sliding event, a mouse click event, a keyboard input event, a microphone input event, a camera input event, and the like.

The process load probe may subscribe a process load from the kernel-mode module, and determine the load of a process (such as the first process) based on the callback function fed back by the kernel-mode module.

The system load probe may subscribe a system load from the kernel-mode module, and determine the system load based on the callback function fed back by the kernel-mode module.

The audio and video status probe may subscribe an audio and video event from the kernel-mode module, and determine a currently occurring audio and video event of the electronic device 100 based on the callback function fed back by the kernel-mode module. Audio and video events may include a GPU decoding event, and the like. For example, the audio and video status probe may send a request to the OsEventDriver node of the executive layer to subscribe the GPU decoding event. The OsEventDriver node forwards the request to the graphics card driver of the kernel-and-driver layer. The graphics card driver can monitor the status of the GPU. After detecting that the GPU is performing a decoding operation, the graphics card driver feeds back a callback function to the audio and video status probe through the OsEventDriver node.

The system event probe may subscribe a system event from the kernel-mode module, and determine the system event based on the callback function fed back by the kernel-mode module. System events may include a window change event, a process creation event, a thread creation event, and the like. For example, the system event probe may send a request to the OsEventDriver node of the executive layer to subscribe the process creation event. The OsEventDriver node forwards the request to the process manager. The process manager may feed back a callback function to the system event probe through the OsEvent-Driver node after creating a process. For another example, the system event probe also sends a request to the API module to subscribe a focused window change event. The API module may monitor whether the focused window of the electronic device 100 has changed. Upon detecting a change of the focused window, the API module feeds back a callback function to the system event probe.

Evidently, the system probe module obtains the probe status by subscribing various events of the electronic device 100 from the kernel-mode module and then determining the running status of the electronic device 100 based on the callback function fed back by the kernel-mode module. Upon obtaining the probe status, the system probe module may feed back the probe status to the scenario recognition module. Upon receiving the probe status, the scenario recognition module may determine the user scenario of the electronic device 100 based on the probe status. The user scenarios may include a video scenario, a game scene, an office scenario, a social scenario, and the like. The user scenario can reflect the current usage requirement of the user. For example, when recognizing that the focused window is a window of a video app, the scenario recognition engine determines that the electronic device 100 is in a video scenario, indicating that the user needs to use a video app to watch and browse videos. For another example, when recognizing that the focused window is a WeChat™ chat window, the scenario recognition engine determines that the electronic device 100 is in a social scenario. The scenario recognition module may further send the user scenario to the basic policy matching manager. The basic policy matching manager may determine a basic scheduling policy (also referred to as a second scheduling policy, details of which will be described in S301 and S302 below) based on the user scenario. The basic policy matching manager may feed back the basic scheduling policy to the scenario recognition module. The scenario recognition module may send the basic scheduling policy and the user scenario to the scheduling engine of the application layer.

As shown in FIG. 3A and FIG. 3B, the scheduling engine includes a load controller, a chip policy combiner, and a scheduling executor. The load controller may receive the basic scheduling policy and user scenario sent by the scenario recognition module. The load controller may further obtain the system load from the system probe module, and adjust the basic scheduling policy based on the system load and the user scenario, so as to obtain an actual scheduling policy (also referred to as a first scheduling policy, details of which will be described in S310 below). The actual scheduling policies include an OS scheduling policy and a first CPU power consumption scheduling policy (also referred to as a first sub-policy). The load controller may send the OS scheduling policy to the scheduling executor. The scheduling executor performs scheduling based on the OS scheduling policy. The OS scheduling policy is used for adjusting a process priority and an I/O priority of a focused process. As an example, the scheduling executor may send an instruction to the process manager to adjust the process priority of the focused process. The process manager adjusts the process priority of the focused process in response to the instruction. In another example, the scheduling executor may send an instruction to the I/O manager to adjust the I/O priority of the focused process. The I/O manager adjusts the I/O priority of the focused process in response to the instruction.

The load controller may further send a first CPU power consumption scheduling policy to the chip policy combiner. The chip policy combiner may obtain a second CPU power consumption scheduling policy (also referred to as a second sub-policy, details of which will be described in S317 to S325 below) based on the chip platform type of the CPU and the first CPU power consumption scheduling policy. The chip platform of the CPU comes in two types: Advanced Micro Devices (Advanced Micro Devices, AMD)® CPU, and Intel® (Intel®) CPU. The two types of CPUs adjust the CPU power consumption in different ways, and therefore, need to be differentiated.

If the chip platform type of the CPU is AMD (also referred to as a first type), the scheduling executor may send an EPP adjustment instruction to the power manager to adjust the EPP value of the CPU. In addition, the scheduling executor may send a PL1 and PL2 adjustment instruction to the OS2SOC driver node to adjust the PL1 and PL2 of the CPU.

If the chip platform type of the CPU is Intel®, the scheduling executor may send the second CPU power consumption scheduling policy to the Intel DTT driver through a WMI plug-in. The second CPU power consumption scheduling policy may include a minimum PL1 value, a maximum PL1 value, PL2, PL2 duration, and EPP. The Intel DTT drives the CPU to run based on the second CPU power consumption scheduling policy.

The resource scheduling method according to this embodiment of this application mainly includes the following two processes: (1) determining the user scenario of the electronic device; and (2) performing resource scheduling based on the user scenario of the electronic device and the system load of the electronic device. The two processes are described below separately with reference to the drawings.

Figure 4A:
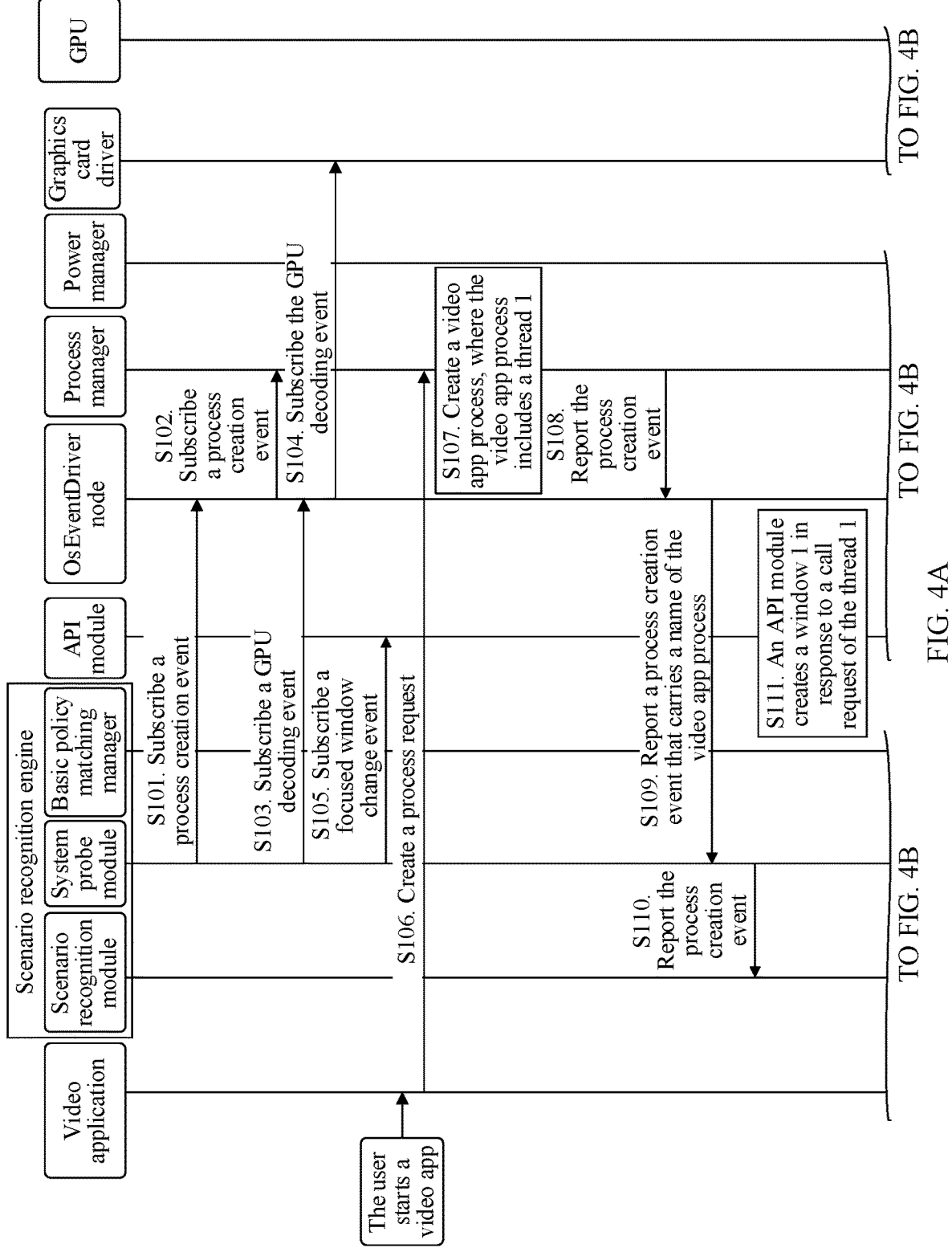
FIG. 4A, FIG. 4B, and FIG. 4C are a schematic diagram of signal exchange according to an embodiment of this application.
Figure 4B:
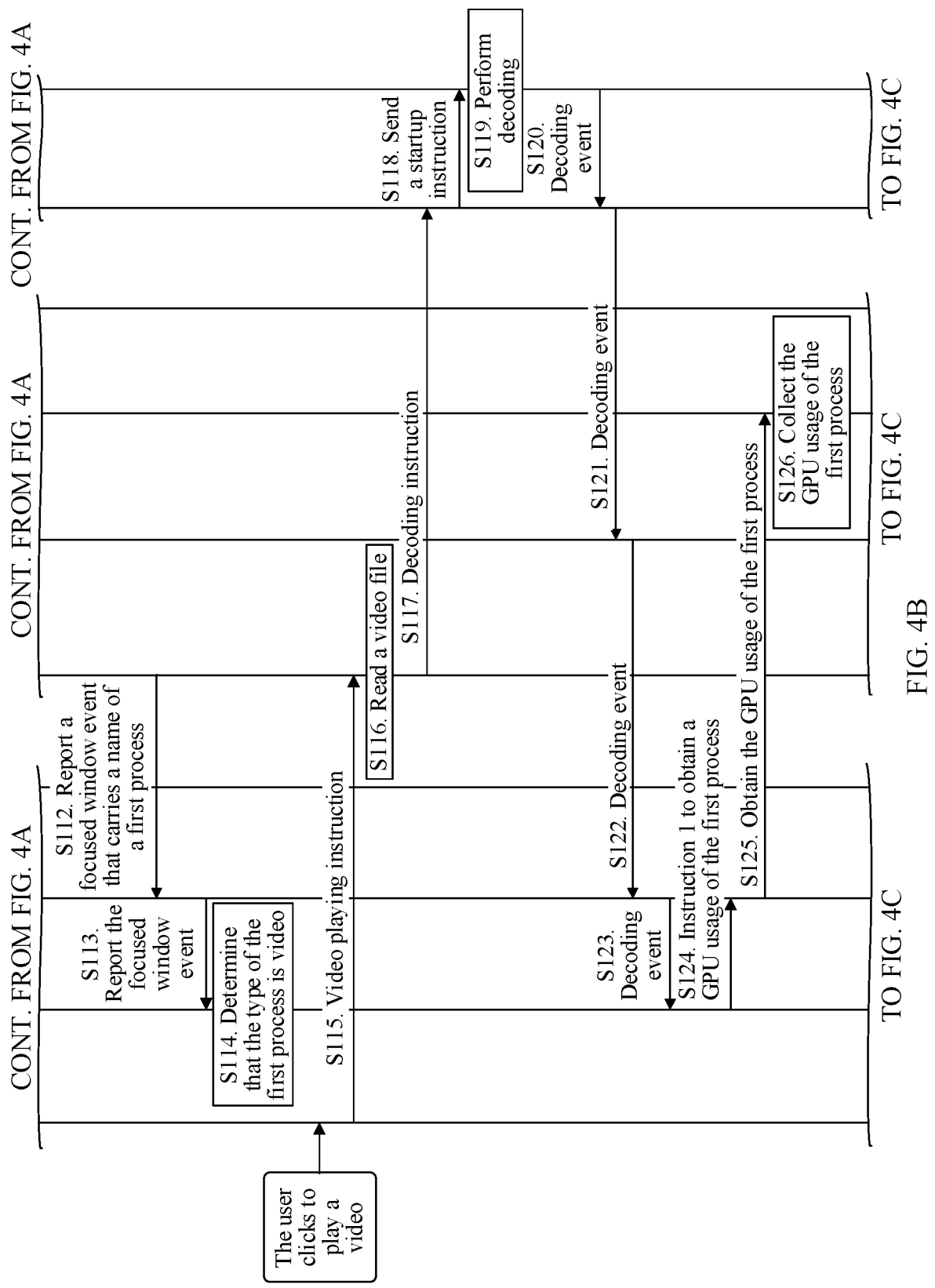
Figure 4C:
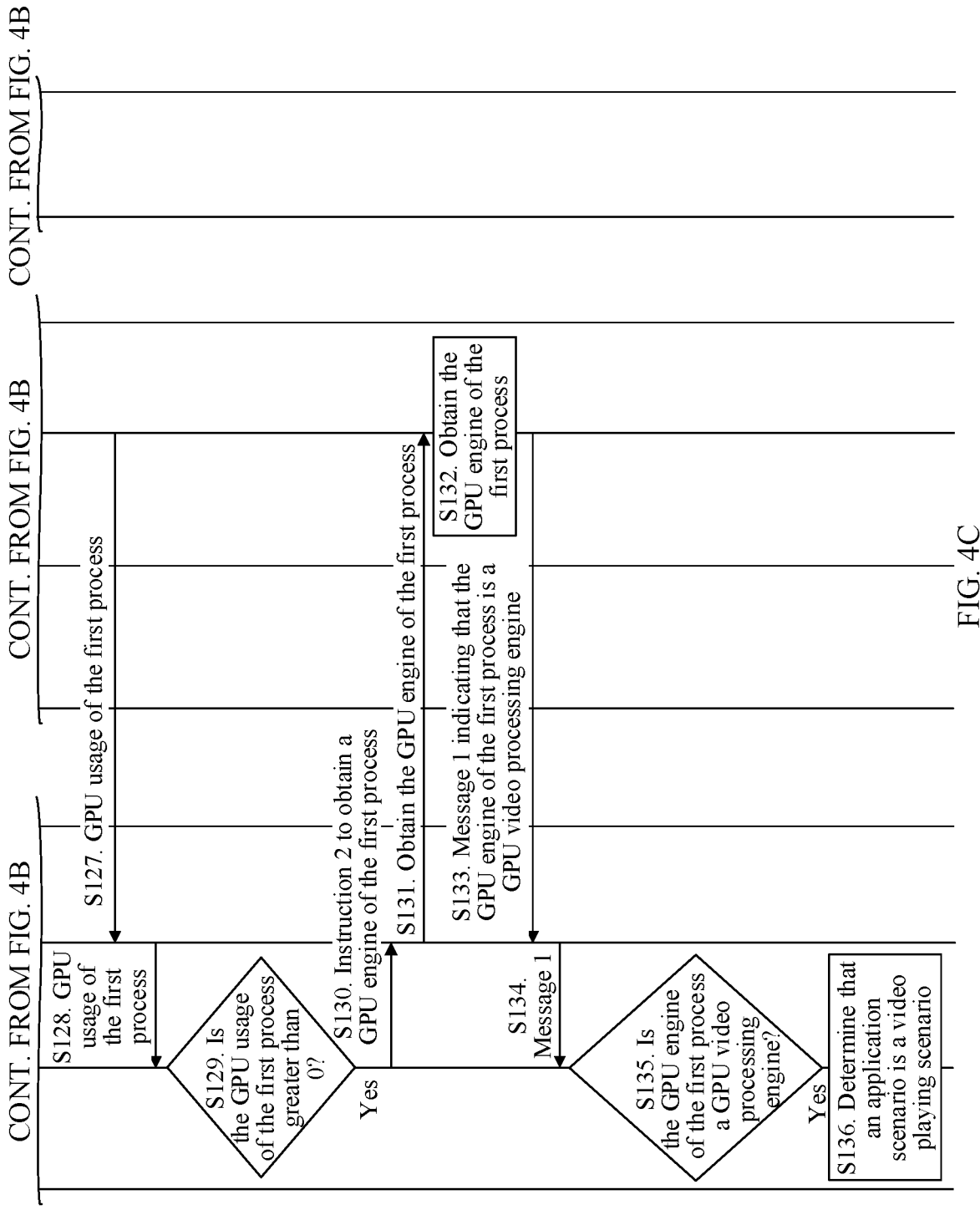

Using an example in which the electronic device is in a video playing scenario, an interaction process of some modules in the electronic device shown in FIG. 3A and FIG. 3B is described below with reference to FIG. 4A, FIG. 4B, and FIG. 4C. As shown in FIG. 4A, FIG. 4B, and FIG. 4C, a process of determining a user scenario of an electronic device in a resource scheduling method according to an embodiment of this application is as follows:

S101. A system probe module sends a request to an OsEventDriver node to subscribe a process creation event.

As shown in FIG. 3A and FIG. 3B, a scenario recognition engine includes the system probe module. The system probe module includes a system event probe. In an embodiment of this application, the system event probe may send a request to the OsEventDriver node on the executive layer to subscribe a process creation event. The request for subscribing the process creation event may be referred to as a first request.

In an optional embodiment, the request for subscribing the process creation event may carry a process name. That is, the scenario recognition engine may subscribe the creation event of just a specified process, thereby reducing the interference from creation events of irrelevant processes.

For example, the specified process may be a process of a video app, a process of a game app, a process of an office app, a process of a social app, or the like. Definitely, in other embodiments, the scenario recognition engine may impose no limitation on the subscribed process creation events.

S102. The OsEventDriver node sends the request to a process manager to subscribe the process creation event.

For the request for subscribing the process creation event, reference may be made to the description of step S101, and details are omitted here.

In other words, a system event probe of the scenario recognition engine may send the request to the process manager through the OsEventDriver node to subscribe the process creation event.

Understandably, the OsEventDriver node may register a callback with the process manager. The purpose of registering the callback is to return the process creation event to the OsEventDriver node after the process manager creates a process.

S103. The system probe module sends a request to the OsEventDriver node to subscribe a GPU decoding event.

Still as shown in FIG. 3A and FIG. 3B, the system probe module further includes an audio and video status probe. In this embodiment of this application, the request for subscribing a GPU decoding event may be sent to the OsEventDriver node by the audio and video status probe of the system probe module. The request for subscribing the GPU decoding event may be referred to as a third request.

S104. The OsEventDriver node sends the request to a graphics card driver to subscribe the GPU decoding event.

To be specific, an audio and video status probe of the scenario recognition engine may send the request to the graphics card driver through the OsEventDriver node to subscribe the GPU decoding event. Similarly, the OsEventDriver node may register a callback with the graphics card driver. The purpose of registering the callback is to return the GPU decoding event to the OsEventDriver node after the graphics card driver detects a decoding operation performed by the GPU.

S105. The system probe module sends a request to the API module to subscribe a focused window change event.

The API module may include a Windows user interface API implemented by user32.dll. This API is used for creating a window. In an optional embodiment, the system event probe of the system probe module may send a request to the Windows user interface API of the API module to subscribe a focused window change event. The request for subscribing the focused window change event may be referred to as a second request.

Similarly, the system event probe may register a callback with the API module. The purpose of registering the callback is to return the focused window change event to the system event probe when (the Windows user interface API of) the API module detects a change of the focused window.

The focused window is a window brought into focus, and is probably the window that the user currently needs to use. Therefore, the usage requirements of the user can be determined by monitoring the focused window. For example, if the focused window is a window of a video app, it indicates that the user needs to browse and play a video. For another example, if the focused window is a window of a game app, it indicates that the user needs to play a game. Whether the user requirement has changed can be determined by monitoring the change of the focused window. For example, if the focused window changes from the window of a video app to the window of a game app, it indicates that the current requirement of the user has changed from video watching to game playing.

It is to be noted that no strict sequence is specified between steps S101, S103, and S105. Such steps may be performed sequentially in the order shown in FIG. 4A, FIG. 4B, and FIG. 4C, or may be performed concurrently, or may be performed in the order from S103 to S101 and to S105 sequentially, or from S103 to S105 and to S101 sequentially, or from S105 to S101 and to S103 sequentially, or from S105 to S103 and to S101 sequentially. Correspondingly, no strict sequence is specified between steps S102, S104, and S106, as long as step S102 is performed after step S101, step S104 is performed after step S103, and step S106 is performed after step S105. The order is not particularly limited herein.

S106. The video app sends a process creation request to the process manager in response to a received user operation of starting the video app.

The process creation request carries a storage address of the video app.

The video app may send a process creation request (not shown in the drawing) to the process manager through the kernel32.dll API and the Ntdll.dll API of the API module.

S107. The process manager creates a video app process.

Specifically, the process manager may find a binary file of the video app based on the storage address. By loading the binary file of the video app, an environment for running the process can be created, and the video app process can be started.

In a Windows operating system, it is defined that one occurrence of running an app is a process. A process may include a plurality of threads. A window is an instance of a window structure, and is a graphical user interface (graphical user interface, GUI) resource. The window is created by a thread. A thread owns all the windows created by the thread. In this embodiment of this application, if the electronic device runs a video app, the process manager needs to create a process of this video app, that is, a video app process (also known as a first process). The video app process includes a plurality of threads. The plurality of threads includes a thread 1. The thread 1 may be used for creating a main window of the video app. The main window is a window in which all functional buttons of the video app are integrated.

S108. The process manager reports a process creation event to the OsEventDriver node.

The process creation event may include a name of a process created by the process manager. In this embodiment of this application, the name of the process is the name of the video app process. Definitely, if the process created by the process manager is a process of another app, the name of the process is the corresponding name of the process of the other app.

As mentioned earlier, the OsEventDriver node has sent the request to the process manager to subscribe the process creation event, and has registered callback. Therefore, the process manager may report a process creation event to the OsEventDriver node after creating the video app process.

S109. The OsEventDriver node reports the process creation event to the system probe module.

For the description of the process creation event, reference may be made to step S108, and details are omitted here.

In this embodiment of this application, the OsEventDriver node may report the process creation event to the system event probe of the system probe module.

S110. The system probe module sends the process creation event to the scenario recognition module.

S111. The API module creates a window 1 in response to a call request of the thread 1.

Figure 5:
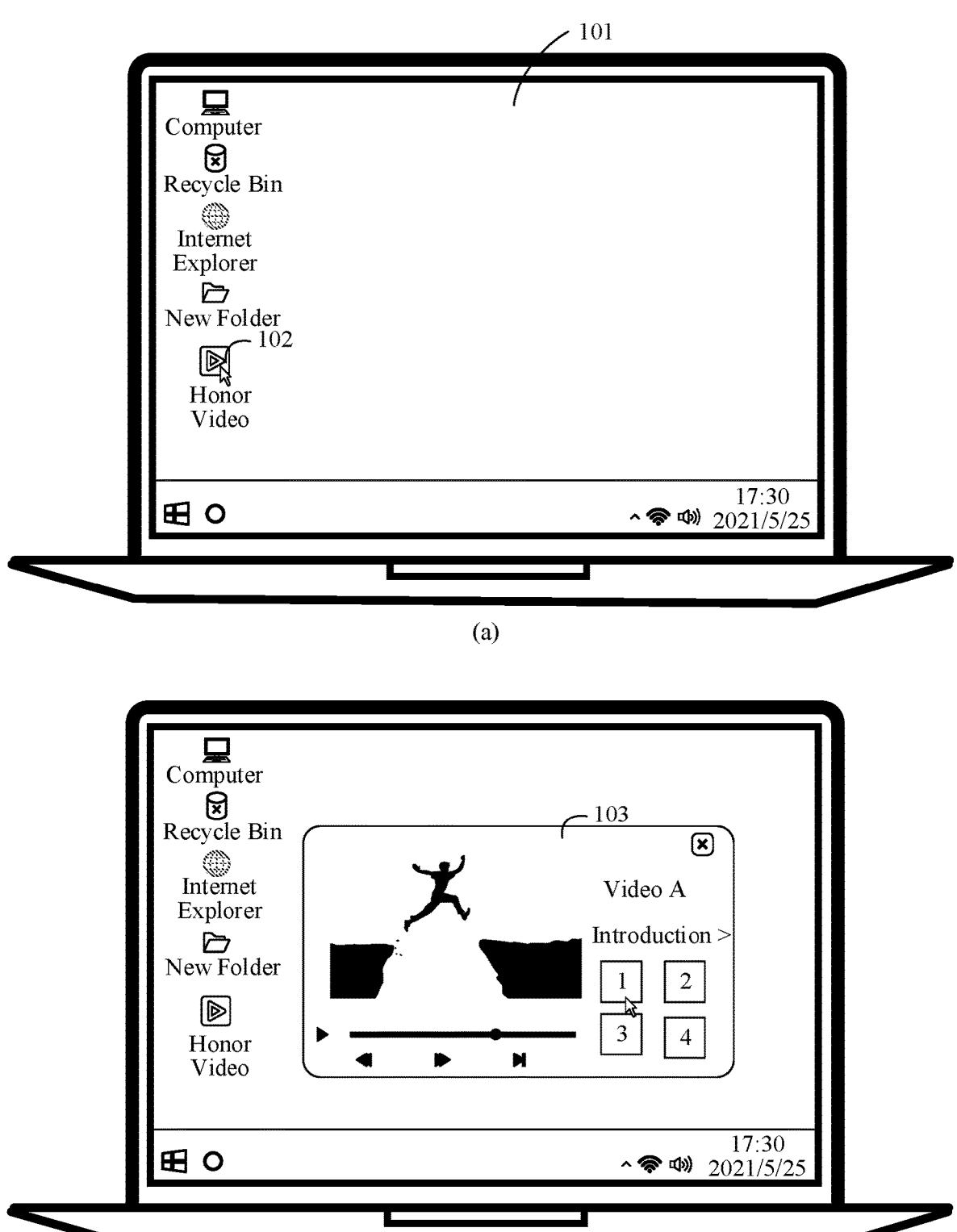
FIG. 5 is an interface diagram according to an embodiment of this application.

After the process manager creates a video app process, the thread 1 of the video app process actively calls the Windows user interface API of the API module to create a window 1. As an example, as shown in part (a) of FIG. 5, the electronic device may display a window 101. The window 101 may be a desktop, also known as a main interface. The window 101 includes an icon 102 of a video app. The electronic device may receive an operation of the user clicking on the icon 102 of the video app. In response to the operation, as shown in part (c) of FIG. 5, the electronic device displays a window 103 (that is, the window 1, also known as a first window). In the above process, the focused window changes from the original window 101 to the window 103.

S112. The API module reports a focused window event to the system probe module.

In this embodiment of this application, after creating the window 1, the Windows user interface API of the API module may obtain the name of the first process (that is, the focused process) and the name of the second process. The first process is a process corresponding to the current focused window (that is, window 1), and the second process is a process corresponding to the last focused window (for example, window 2). As an example, the process corresponding to the window 1 is a video app process (the first process), and the name of this process is hlive.exe, for example. The process corresponding to the window 2 is the process (the second process) of the Windows program manager, and the name of this process is explorer.exe, for example. Because the name of the first process is inconsistent with the name of the second process, the API module determines that the focused window has changed, and reports a focused window event to the system event probe of the system probe module. The focused window change event includes the name of the first process (that is, the focused process). As an example, the first process is a video app process, and the focused window change event carries the name of the video app process.

It is to be noted that, in a case that the electronic device has started the video app, the electronic device may skip step S106 to step S111. After the system probe module sends a request to the API module to subscribe the focused window change event, if the user switches the focused window to a video app window, the API module can also detect the change of the focused window and report the focused window event to the system probe module.

S113. The system probe module sends the focused window event to the scenario recognition module.

S114. The scenario recognition module determines that the type of the first process is video.

An application list may be preset in the electronic device. The scenario recognition module may check whether the application list includes the first process. If the application list includes the first process, the scenario recognition module can determine the type of the first process. The application list includes the process name of each application and the type of the application. An exemplary application list is shown in Table 1.

TABLE 1

| Application | Process name | Type |
| --- | --- | --- |
| Honor Video | hlive.exe | Video |
| word | word.exe | Office |
| Shooter game | shot.exe | Game |

TABLE 1-continued

| Application | Process name | Type |
|---|---|---|
| WeChat ™ | wechat.exe | Social |
| . . . | . . . | . . . |

For example, the name of the first process is hlive.exe, and therefore, the scenario recognition module determines that the type of the first process is video. For another example, the name of the first process is wechat.exe, and therefore, the scenario recognition module determines that the type of the first process is social. It is to be noted that Table 1 is merely an example. In fact, Table 1 may include the process names of more apps and the corresponding types.

It is to be noted that the purpose of this step is to preliminarily determine the user scenario of the electronic device. The user scenarios of the electronic device may include a video scenario, a game scene, a social scenario, an office scenario, a browser scenario, and the like. The video scenario may further include a video playing scenario and a video browse scenario. The social scenario may further include a text chat scenario, a voice chat scenario, a video chat scenario, and the like. The office scenario may further include a document edit scenario, a document browse scenario, a videoconference scenario, and the like. The browser scenario may include a web page browse scenario, a video playing scenario, and the like.

In this step, the type of the user scenario of the electronic device can be determined based on the type of the first process. For example, if it is determined that the type of the first process is video, it can be determined that the electronic device is in a video scenario. For another example, if it is determined that the type of the first process is game, it can be determined that the electronic device is in a game scene. To further analyze user requirements, the scenario recognition module may further analyze the specific scenario of the electronic device with further reference to other parameters (such as peripheral events and GPU running status), so as to make the analysis result more accurate, details of which will be described herein later and are omitted here.

S115. The video app sends a video playing instruction to the API module in response to a received video playing operation of the user.

Specifically, the video app may send the video playing instruction to a DirectX API of the API module. The video playing instruction may include a cache address of the video.

S116. The API module reads a video file.

The API module may read the corresponding video file based on the cache address carried in the video playing instruction.

S117. The API module sends a decoding instruction to the graphics card driver.

S118. The graphics card driver sends a startup instruction to the GPU.

S119. The GPU performs decoding.

Specifically, the GPU may decode the video file through a GPU video processing engine.

S120. The GPU reports a decoding event to the graphics card driver.

S121. The graphics card driver reports the decoding event to the OsEventDriver node.

S122. The OsEventDriver node reports the decoding event to the system probe module.

Specifically, the OsEventDriver node reports the decoding event to an audio and video status probe of the system probe module.

S123. The system probe module sends the decoding event to the scenario recognition module.

S124. The scenario recognition module sends an instruction 1 to the system probe module.

The instruction 1 instructs the system probe module to obtain a GPU usage of the first process. The instruction 1 may carry the name of the first process.

S125. The system probe module sends a request to the process manager to obtain the GPU usage of the first process.

The request for obtaining the GPU usage of the focused process may carry the name of the first process.

In an optional embodiment, the audio and video status probe of the system probe module may send the request to the process manager to obtain the GPU usage of the first process.

S126. The process manager collects the GPU usage of the first process.

Specifically, the process manager may collect the GPU usage of the first process through a graphics kernel (graphics kernel) interface of the graphics card driver.

S127. The process manager sends the GPU usage of the first process to the system probe module.

The process manager may send the GPU usage of the first process to the audio and video status probe of the system probe module.

S128. The system probe module sends the GPU usage of the first process to the scenario recognition engine.

S129. The scenario recognition module determines whether the GPU usage of the first process is greater than 0.

If the GPU usage of the first process is greater than 0, the process goes to step S130.

Based on the GPU usage of the first process, it can be determined whether the first process uses the GPU during the running. If the GPU usage of the first process is greater than 0, it is considered that the first process has used the GPU during running. If the GPU usage of the first process is 0, it indicates that the first process does not use the GPU during running.

S130. The scenario recognition module sends an instruction 2 to the system probe module.

The instruction 2 instructs the system probe module to obtain a GPU engine of the first process. The instruction 2 may carry the name of the first process.

S131. The system probe module sends a request to the process manager to obtain the GPU engine of the first process.

The audio and video status probe of the system probe module may send the request to the process manager to obtain the GPU engine of the first process. The request for obtaining the GPU engine of the first process carries the name of the first process.

The GPU engines include a GPU 3D engine, a GPU copy engine, a GPU video encode engine, and a GPU video processing engine. The GPU 3D engine is mainly responsible for processing 2D or 3D graphics. The GPU copy engine is mainly used for transmitting data. The GPU video encode engine is mainly used for performing encoding operations. The GPU video processing engine is mainly used for performing decoding operations. In some embodiments, the GPU video processing engine may be replaced by a GPU video decode engine.

S132. The process manager obtains the GPU engine of the first process.

Specifically, the process manager may obtain the GPU engine of the first process through the graphics kernel interface of the graphics card driver.

S133. The process manager sends a message 1 to the system probe module. The message 1 indicates that the GPU engine of the first process is a GPU video processing engine.

Specifically, the process manager may send the message to the audio and video status probe of the system probe module, and then the audio and video status probe forwards the message to the scenario recognition module.

S134. The system probe module sends the message 1 to the scenario recognition module.

S135. The scenario recognition module determines whether the GPU engine of the first process is a GPU video processing engine.

If the GPU engine of the first process is a GPU video processing engine, the process goes to S129. If the GPU engine of the first process is not a GPU video processing engine, the process goes to S130.

In step S114, the scenario recognition engine has determined that the type of the first process is video, that is, it is determined that the electronic device is in a video scenario. Through step S135, the scenario recognition engine determines the specific operation performed by the first process through the GPU, and in turn, determines the specific operation performed by the user by using the video app. For example, if the GPU engine of the first process is a GPU video processing engine, it indicates that the first process uses the GPU to perform a decoding operation, and it is determined that the user is playing a video by using the video app. For another example, if the GPU engine of the first process is not a GPU video processing engine, it indicates that the first process is not using the GPU to perform a decoding operation. Therefore, the user is probably browsing video resources on the video app before playing a video.

S136. The scenario recognition module determines that the user scenario is a video playing scenario based on the process information of the first process.

The process information of the first process includes information such as the name of the first process, the app type of the first process, the GPU usage of the first process, and the GPU engine used by the first process.

Overall, it can be determined that the electronic device is in a video playing scenario if the type of the first process (focused process) is video, the GPU usage of the first process is greater than 0, and the GPU engine of the first process is a GPU video processing engine.

It is to be noted that, steps S101 to S136 are described by using just an example in which the electronic device is in a video playing scenario under the category of a video scenario. In fact, the electronic device may be in other user scenarios instead (for example, a game scene, an office scenario, a social scenario, or a video browse scenario).

In an optional embodiment, it can be determined that the electronic device is in a game scene if the scenario recognition engine determines that the type of the first process (focused process) is game, the power mode of the CPU is a game mode (game mode), the GPU usage of the first process is greater than 0, and the GPU engine of the first process is a GPU 3D engine.

The power status probe of the system probe module may send a request to the power manager to subscribe a power mode change event. The power manager may report the power mode change event to the power status probe of the system probe module when the power mode changes to a game mode (game mode). In this way, through the power mode change event, the scenario recognition engine can determine whether the power mode of the CPU is game mode.

In addition, for the process by which the scenario recognition engine obtains the type of the first process, reference may be made to steps S101, S102, S105, and steps S106 to S114 in FIG. 4A, FIG. 4B, and FIG. 4C. For the process by which the scenario recognition engine determines whether the GPU usage of the first process is greater than 0 and whether the GPU engine of the first process is a GPU 3D engine, reference may be made to steps S124 to S135. The difference lies in the game app in place of video app, details of which are omitted here.

Figure 6A:
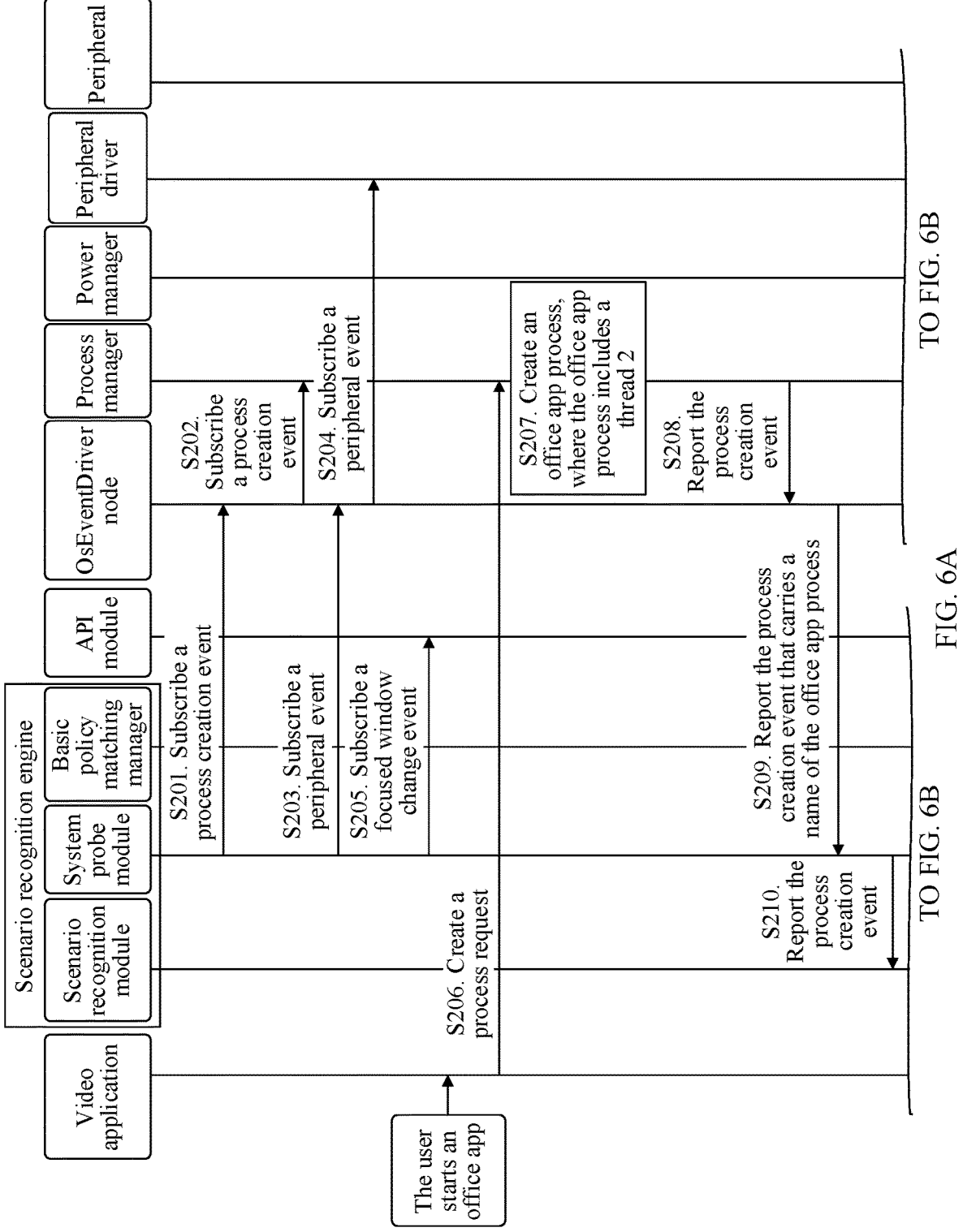
FIG. 6A and FIG. 6B are another schematic diagram of signal exchange according to an embodiment of this application.
Figure 6B:
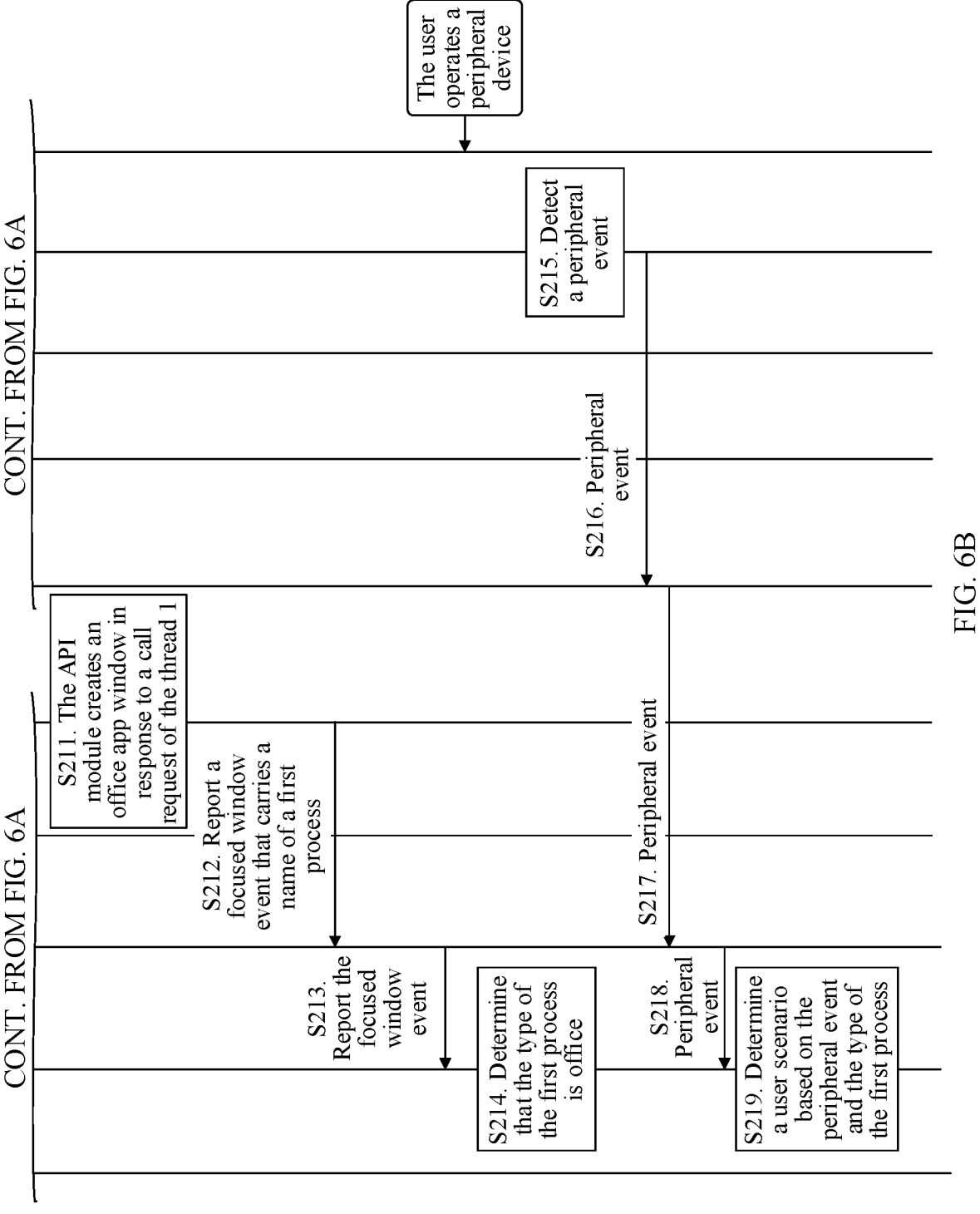

With reference to FIG. 6A and FIG. 6B, the following briefly describes a process of determining the user scenario of the electronic device when the electronic device is in an office scenario. It is to be noted that the principles and process are substantially similar between the flowchart shown in FIG. 6A and FIG. 6B and the flowchart shown in FIG. 4A, FIG. 4B, and FIG. 4C. The following specifically describes only the differences between the two flowcharts. The similarities are omitted here, and may be learned by referring to the description of the relevant steps in FIG. 4A, FIG. 4B, and FIG. 4C. FIG. 6A and FIG. 6B show a resource scheduling method according to an embodiment of this application, in which a process of determining a user scenario of an electronic device is as follows:

S201. A system probe module sends a request to an OsEventDriver node to subscribe a process creation event.

S202. The OsEventDriver node sends the request to a process manager to subscribe the process creation event.

S203. The system probe module sends a request to the OsEventDriver node to subscribe a peripheral event.

As shown in FIG. 3A and FIG. 3B, the system probe module further includes a peripheral status probe. In this embodiment of this application, the request for subscribing a peripheral event may be sent to the OsEventDriver node by the peripheral status probe of the system probe module. The request for subscribing the peripheral event may be referred to as a fourth request.

Peripheral events include a mouse wheel sliding event, a mouse click event, a keyboard input event, a camera input event, a microphone input event, and the like.

S204. The OsEventDriver node sends the request to a peripheral driver to subscribe the peripheral event.

It is to be noted that the peripheral driver is a generic term for drivers of all peripheral devices, and may include, for example, a mouse driver, a keyboard driver, a camera driver, a microphone driver, and the like.

S205. The system probe module sends a request to the API module to subscribe a focused window change event.

S206. The office app sends an office app process creation request to the process manager in response to a received user operation of starting the office app.

The office app process creation request may carry a storage address of the office app.

S207. The process manager creates an office app process.

Specifically, the process manager may find a binary file of the office app based on the storage address. By loading the binary file of the office app, an environment for running the process can be created, and the office app process can be started. In addition, the office app process includes a thread 2. The thread 2 may be used for creating a main window of the office app.

S208. The process manager reports a process creation event to the OsEventDriver node.

S209. The OsEventDriver node reports the process creation event to the system probe module.

The process creation event carries the name of the office app process.

S210. The system probe module sends the process creation event to the scenario recognition module.

S211. The API module creates an office app window in response to a call request of the thread 2.

S212. The API module reports a focused window event to the system probe module.

The focused window event carries the name of the first process (focused process). Understandably, in this embodiment of this application, the first process is an office app process.

S213. The system probe module sends the focused window event to the scenario recognition module.

S214. The scenario recognition module determines that the type of the first process is office.

For example, the name of the first process is word.exe, and therefore, the scenario recognition module determines that the type of the first process is office.

S215. The peripheral driver detects a peripheral event in response to a user operation performed on a peripheral.

S216. The peripheral driver reports the peripheral event to the OsEventDriver node.

S217. The OsEventDriver node sends the peripheral event to the system probe module.

S218. The system probe module sends the peripheral event to the scenario recognition module.

S219. The scenario recognition module determines the user scenario based on the peripheral event and the type of the first process.

In an optional embodiment, if the scenario recognition engine determines that the type of the first process (focused process) is office and the peripheral event is a mouse wheel sliding event or a click event, the scenario recognition engine can determine that the electronic device is specifically in a document browse scenario under the category of the office scenario. Alternatively, if the scenario recognition engine determines that the type of the first process (focused process) is office and the mouse wheel sliding event, click event, and keyboard input event are no longer received within a preset time (such as 10 seconds) after receiving a keyboard input event, the scenario recognition engine can determine that the electronic device is specifically in a document browse scenario under the category of the office scenario.

In an optional embodiment, if the scenario recognition engine determines that the type of the first process (focused process) is office and a keyboard input event is received, the scenario recognition engine can determine that the electronic device is specifically in a document edit scenario under the category of the office scenario.

In an optional embodiment, if the scenario recognition engine determines that the type of the first process (focused process) is office and a camera input event is received (that is, the camera is in a turned-on state, and a video stream is input in the camera), the scenario recognition engine can determine that the electronic device is specifically in a videoconference scenario under the category of the office scenario.

The electronic device may be in a social scenario instead. The social scenario includes three specific scenarios: a text chat scenario, a voice chat scenario, and a video chat scenario. The principle of determining whether the electronic device is in the social scenario is similar to the principle of determining whether the electronic device is in the office scenario, details of which are omitted here. The following describes just the conditions that need to be met for determining that the electronic device is in the social scenario.

In an optional embodiment, if the scenario recognition engine determines that the type of the first process (focused process) is social and a keyboard input event is received, the scenario recognition engine can determine that the electronic device is specifically in a text chat scenario under the category of the social scenario.

In an optional embodiment, if the scenario recognition engine determines that the type of the first process (focused process) is social, a microphone input event is received, and the camera is in a turned-off state, then the scenario recognition engine can determine that the electronic device is specifically in a voice chat scenario under the category of the social scenario.

In an optional embodiment, if the scenario recognition engine determines that the type of the first process (focused process) is social and both a microphone input event and a camera input event are received, then the scenario recognition engine can determine that the electronic device is specifically in a video chat scenario under the category of the social scenario.

What is described above illustrates how to recognize the user scenario of the electronic device. After determining the user scenario of the electronic device, the electronic device may perform resource scheduling based on the user scenario of the electronic device and the system load. In this way, the CPU of the electronic device can run according to the actual needs of the user, thereby avoiding excessive CPU performance without compromising user experience.

Figure 7A:
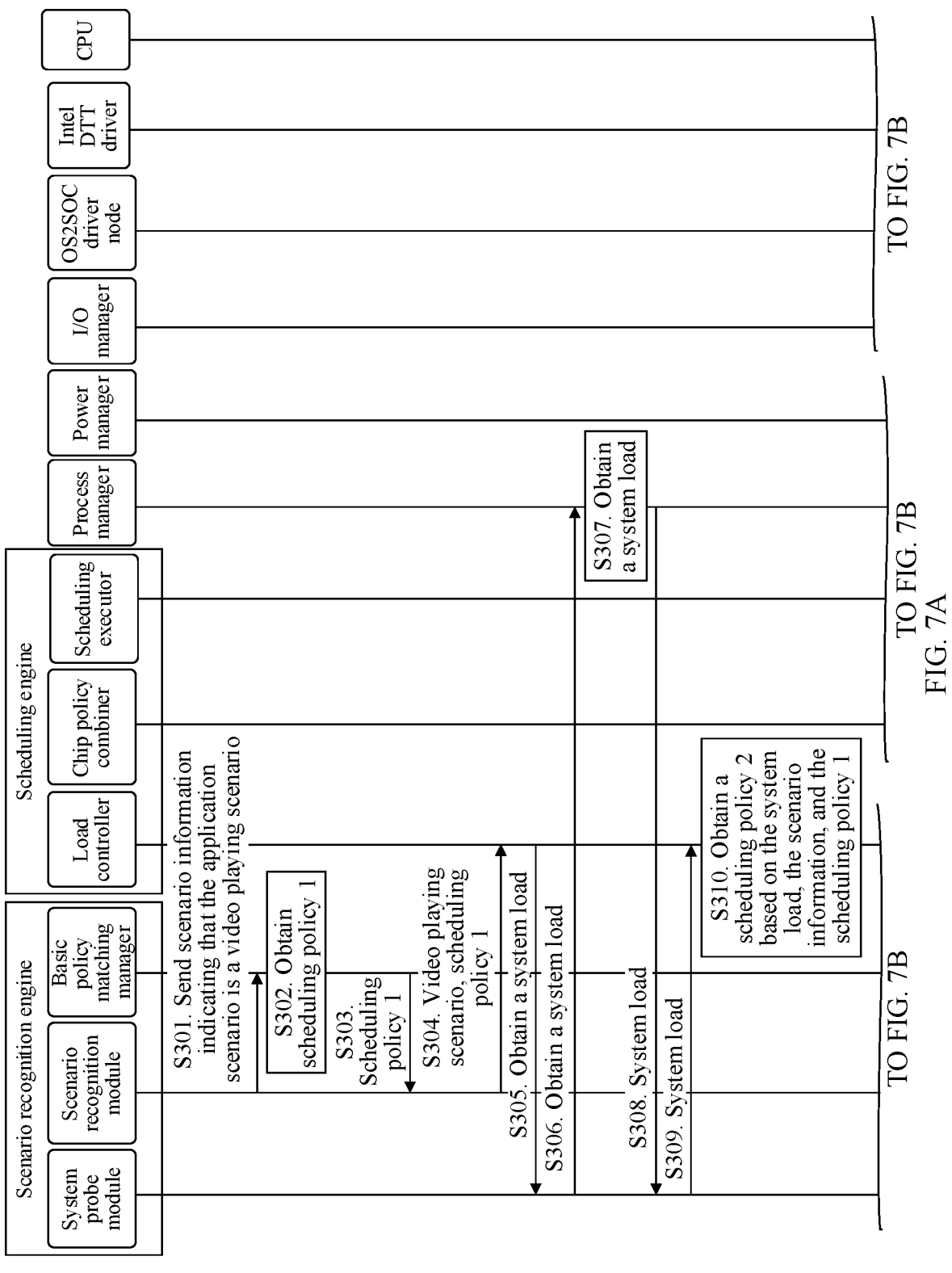
FIG. 7A, FIG. 7B, and FIG. 7C are another schematic diagram of signal exchange according to an embodiment of this application.
Figure 7B:
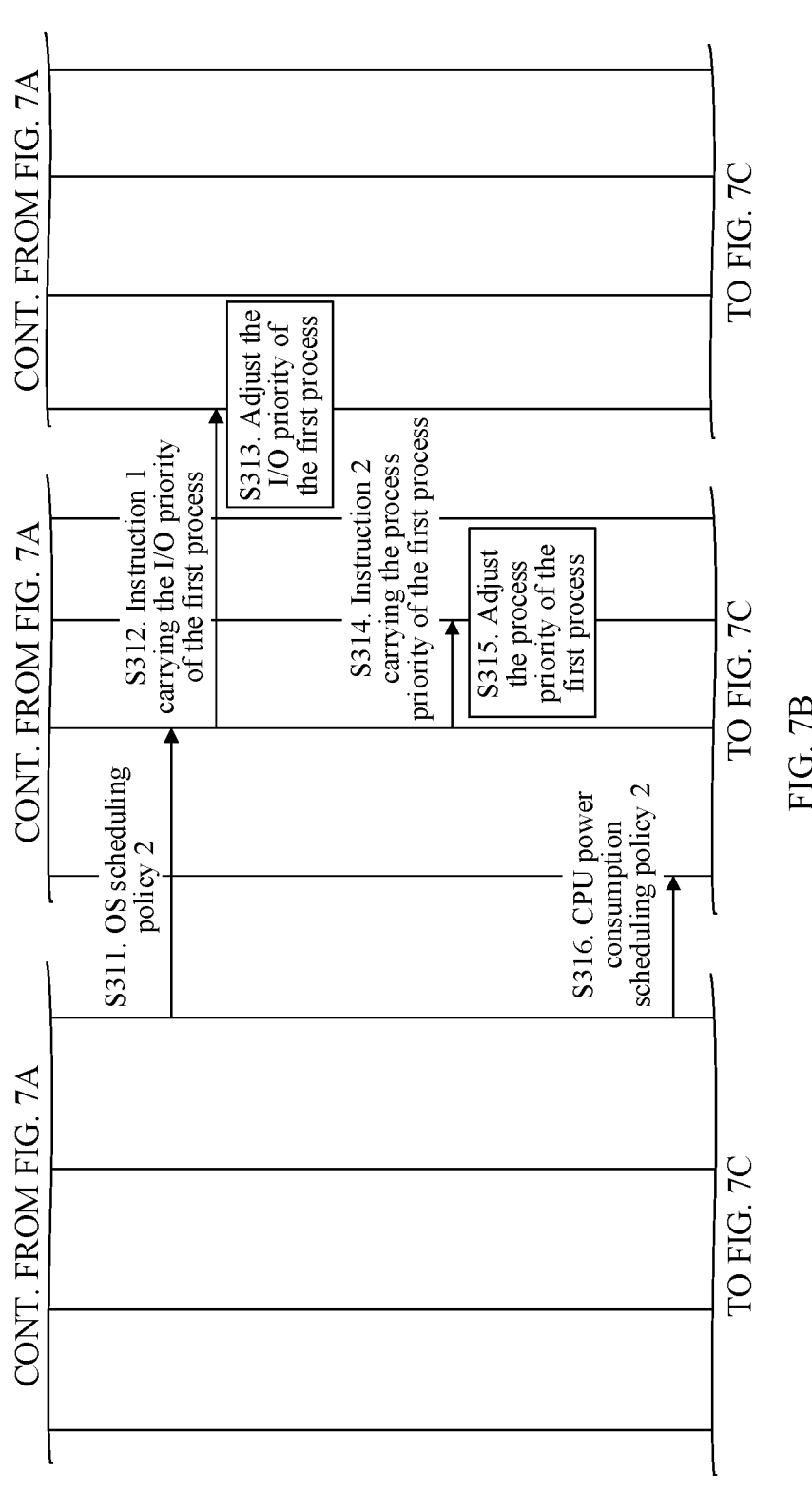
Figure 7C:
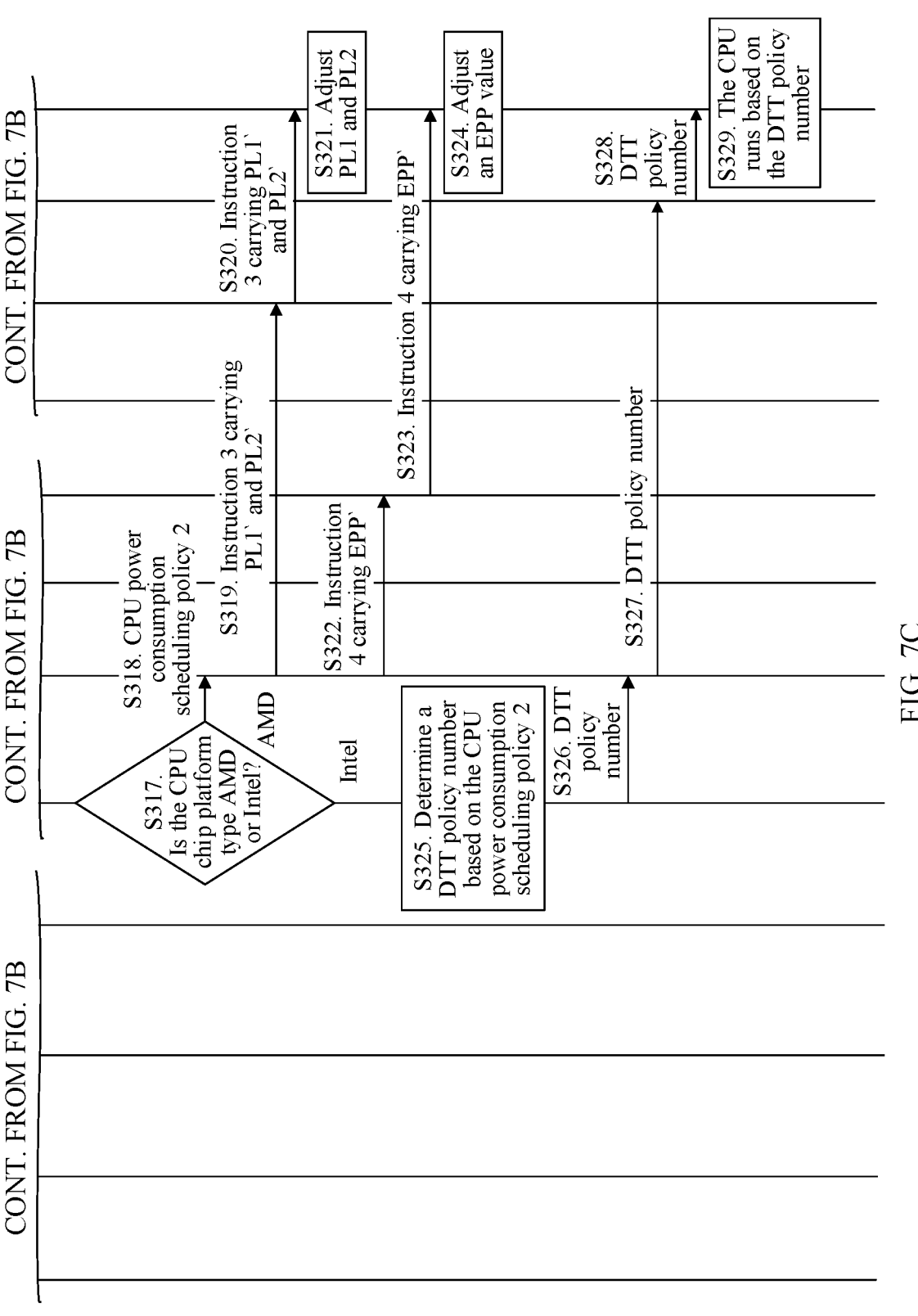

The following further describes a resource scheduling process of the electronic device using an example in which the electronic device is in a video playing scenario. As shown in FIG. 7A, FIG. 7B, and FIG. 7C, a resource scheduling process in a resource scheduling method according to an embodiment of this application is as follows:

As shown in FIG. 7A, FIG. 7B, and FIG. 7C, the resource scheduling method according to this embodiment of this application further includes:

S301. The scenario recognition module sends scenario information to the basic policy matching manager.

The scenario information is used for indicating the user scenario of the electronic device. As an example, the electronic device may assign a unique identifier to each different user scenario in advance. The scenario information may include the unique identifier of the user scenario. For example, the identifier (for example, V01) may indicate that the electronic device is in a video playing scenario. For another example, the identifier (for example, V02) may indicate that the electronic device is in a video browse scenario.

For details of the process by which the scenario recognition module determines the user scenario of the electronic device, reference may be made to steps S101 to S136, and the details are omitted here.

S302. The basic policy matching manager obtains the scheduling policy 1 based on the scenario information.

The scheduling policy 1 includes an OS scheduling policy 1 and a CPU power consumption scheduling policy 1. The OS scheduling policy 1 includes a first process priority and a first I/O priority of the first process. The scheduling policy 1 is also referred to as a second scheduling policy.

The priority of the first process is used for measuring the capability of the first process in preempting the CPU. The higher the priority of the first process, the more preemptively the process can occupy the CPU resources, and in turn, the more smoothly the first process runs. In an optional embodiment, the priority of the focused process includes the following levels in descending order: real-time, high, higher than normal, normal, lower than normal, and low. The priority of the first process may be understood as a focused process priority (focus process priority, FPP).

The I/O priority of the first process is used for measuring the responsiveness of the system to the disk and I/O requests of the first process. The higher the I/O priority of the first process, the higher the responsiveness to the disk and I/O requests of the first process, and in turn, the faster the response speed. In an optional embodiment, the I/O priority of the focused process includes the following levels in descending order: crucial, high, normal, low, and very low. The I/O priority of the first process may be understood as a focused process I/O priority (focus process IO priority, FPP_IO).

The CPU power consumption scheduling policy 1 includes a first PL1, a first PL2, and a first EPP value of the CPU.

Evidently, the scheduling policy 1 can be used for adjusting the process priority, the I/O priority, and the CPU power consumption of the first process.

In an optional embodiment, the electronic device may preset various user scenarios and corresponding scheduling policies. As an example, the correspondence between various user scenarios and scheduling policies may be shown in Table 2.

As an example, if it is determined that the user scenario of the electronic device is a text chat scenario under the category of the social scenario, then the scheduling policy 1 includes: the first process priority of the first process is normal; the first I/O priority of the first process is normal; the first PL1 of the CPU is 12 W; the first PL2 of the CPU is 60 W; and the first EPP value is 220. It is to be noted that the scheduling policies in Table 2 are merely illustrative. In practical applications, the process priority, the I/O priority, the PL1, the PL2, and the EPP value may be different from those in Table 2. In addition, Table 2 just shows the scheduling policies for some scenarios. The electronic device in practical use may set more scheduling policies than those in Table 2.

performed by the electronic device for each app in advance. Therefore, the scheduling policy 1 obtained by the basic policy matching manager may be used as a reference scheme for the scheduling policy applied by the electronic device. Further, the electronic device may obtain an actual scheduling policy based on the scheduling policy 1 with reference to the actual system load.

S303. The basic policy matching manager sends the scheduling policy 1 to the scenario recognition module.

S304. The scenario recognition module sends the scheduling policy 1 and the scenario information to the load controller.

To be specific, after determining the scheduling policy 1, the basic policy matching manager forwards the scheduling policy 1 to the load controller through the scenario recognition module. In an optional embodiment, the scenario recognition module may send the scheduling policy 1 and the scenario information to the load controller in two steps separately.

S305. The load controller sends a system load obtaining request to the system probe module.

The system load is an average number of processes in a runnable state and processes in an uninterruptible state. A process in a runnable state is a process that is using the CPU or waiting to use the CPU. A process in an uninterruptible state is a process waiting to perform I/O access (for example, disk I/O access).

S306. The system probe module sends a system load obtaining request to the process manager.

As shown in FIG. 3A and FIG. 3B, the system probe module includes a system load probe. The system load probe may send a system load obtaining request to the process manager. In an optional embodiment, the OsEventDriver node may forward the system load obtaining request of the system load probe to the process manager (not shown in the drawing).

S307. The process manager obtains a system load.

S308. The process manager sends the system load to the system probe module.

Specifically, the process manager may send the system load to the system load probe of the system probe module.

TABLE 2

| User scenario | Sub-scenario | OS scheduling | | CPU power consumption scheduling | | |
| --- | --- | --- | --- | --- | --- | --- |
| | | FPP | FPP_IO | PL1 (W) | PL2 (W) | EPP |
| Social | Text chat | Normal | Normal | 12 | 60 | 220 |
| | Voice chat | Normal | Normal | 15 | 60 | 210 |
| | Video chat | Normal | Normal | 20 | 60 | 180 |
| Office | Document edit | Normal | Normal | 12 | 60 | 220 |
| | Document browsing | Normal | Normal | 12 | 60 | 220 |
| | Videoconference | Normal | Normal | 20 | 60 | 180 |
| Browser | Web page browsing | Normal | Normal | 12 | 60 | 220 |
| | Video playing | Normal | Normal | 20 | 60 | 180 |
| Game | Game playing | Higher than normal | High | 40 | 90 | 50 |
| Video | Video playing | Normal | Normal | 18 | 60 | 200 |
| | Video browsing | Normal | Normal | 12 | 60 | 220 |
| . . . | . . . | . . . | . . . | . . . | . . . | . . . |

It is to be noted that the above scheduling policies are scheduling policies for light load status of the electronic device, and may be configured based on statistics of load characteristics and the CPU power consumption under the corresponding load characteristics, where the statistics are In an optional embodiment, the OsEventDriver node may forward the system load to the system load probe (not shown in the drawing).

S309. The system probe module sends the system load to the load controller.

S310. The load controller obtains a scheduling policy 2 based on the system load, the scenario information, and the scheduling policy 1.

The scheduling policy 2 may include an OS scheduling policy 2 (also referred to as OS scheduling policy) and a CPU power consumption scheduling policy 2 (also referred to as a first sub-policy). The CPU power consumption scheduling policy 2 includes PL1', PL2', and EPP'. PL1' is a PL1 adjusted by the load controller, and may be referred to as a second PL1. PL2' is a PL2 adjusted by the load controller, and may be referred to as a second PL2. EPP' is an EPP adjusted by the load controller, and may be referred to as a second EPP. The scheduling policy 2 is also referred to as a first scheduling policy.

In an optional embodiment, the load controller may divide the system load into three levels: light load, medium load, and heavy load. The electronic device may preset various user scenarios and corresponding adjusted policies. For example, the adjusted policies may be shown in Table 3.

As an example, if the electronic device is in a video playing scenario, as can be learned from Table 3, the scheduling policy 1 is: the process priority of the video app process is normal; the I/O priority of the video app process is normal; the PL1 (that is, the first PL1) of the CPU is 18 W; the PL2 (that is, the first PL2) of the CPU is 60 W; and the EPP value (that is, the first EPP value) is 200. In this case, if the system load is a light load, the scheduling policy does not need to be adjusted. That is, the scheduling policy 2 is the scheduling policy 1. If the system load is a medium load, then the process priority of the video app process needs to keep normal, the I/O priority of the video app process is normal, the PL1 is increased by 22 W on the basis of 18 W, the PL2 is increased by 30 W on the basis of 60 W, and the EPP is decreased by 50 on the basis of 200. In other words, the scheduling policy 2 is: the process priority of the video app process is normal; the I/O priority of the video app process is normal (the OS scheduling policy 2); the PL1' is 40 W; the PL2' is 90 W; and the EPP' value is 150 (the CPU scheduling policy 2). If the system load is a heavy load, then the process priority of the video app process needs to keep normal, the I/O priority of the video app process is adjusted to high, the PL1 is increased by 37 W on the basis of 18 W, the PL2 is increased by 45 W on the basis of 60 W, and the EPP value is decreased by 100 on the basis of 200. In other words, the scheduling policy 2 is: the process priority of the video app process is normal; the I/O priority of the video app process is high; the PL1' is 55 W; the PL2' is 105 W; and the EPP' value is 100.

consumption (for example, mapped through a specified formula). The load controller may calculate the CPU power consumption through the specified formula based on the system load, and in turn, obtain the scheduling policy 2.

S311. The load controller sends the OS scheduling policy 2 to the scheduling executor.

The OS scheduling policy 2 includes a second process priority and a second I/O priority of the first process.

S312. The scheduling executor sends an instruction 1 to the I/O manager.

The instruction 1 carries the second I/O priority of the first process. In addition, as shown in FIG. 3A and FIG. 3B, the scheduling executor includes an I/O priority interface. The instruction 1 may be sent to the I/O manager through the I/O priority interface. The instruction 1 is also referred to as a second instruction.

S313. The I/O manager adjusts the I/O priority of the first process in response to the instruction 1.

To be specific, the I/O manager may adjust the I/O priority of the first process to the second I/O priority. In this way, it is ensured that the first process can preemptively perform I/O access, thereby reducing the time of response to the first process during the I/O access.

S314. The scheduling executor sends an instruction 2 to the process manager.

The instruction 2 carries the second process priority of the first process. In addition, as shown in FIG. 3A and FIG. 3B, the scheduling executor further includes a process priority interface. The instruction 2 may be sent to the process manager through the process priority interface. The instruction 2 is also referred to as a first instruction.

S315. The process manager adjusts the process priority of the first process in response to the received instruction 2.

To be specific, the process manager may adjust the process priority of the first process to the second process priority. In this way, the first process can preempt the CPU resources, thereby ensuring that the first process can run smoothly.

Evidently, by adjusting the I/O priority and the process priority of the first process, the first process is ensured to preemptively perform I/O access and consume the CPU resources, thereby enabling normal and smooth running of the first process and ensuring good user experience.

It is to be noted that no strict sequence is specified between step S312 and step S314. Step S312 may be

TABLE 3

| User scenario | Sub- scenario | System load | OS scheduling | | CPU power consumption scheduling | | |
| --- | --- | --- | --- | --- | --- | --- | --- |
| | | | FPP | FPP_IO | PL1 (W) | PL2 (W) | EPP |
| Social | Text chat | Light | Normal | Normal | 12 | 60 | 220 |
| | | Medium | Normal | Normal | +8 (20) | +30 (90) | −70 (150) |
| | | Heavy | Higher than normal | High | +43 (55) | +45 (105) | −100 (120) |
| Video | Video playing | Light | Normal | Normal | 18 | 60 | 200 |
| | | Medium | Normal | Normal | +22 (40) | +30 (90) | −50 (150) |
| | | Heavy | Normal | High | +37 (55) | +45 (105) | −100 (100) |
| . . . | . . . | . . . | . . . | . . . | . . . | . . . | . . . |

It is to be noted that Table 3 just shows some user scenarios and the corresponding adjusted policies. The electronic device may set more adjusted policies than those in Table 3, without being limited herein.

In an optional embodiment, a specified mapping relationship is satisfied between the system load and the CPU power performed before step S314, or step S314 may be performed before step S312, or steps S314 and S312 may be performed simultaneously.

S316. The load controller sends a CPU power consumption scheduling policy 2 to a chip policy combiner.

S317. The chip policy combiner determines that the chip platform type of the CPU is AMD® or Intel®.

The AMD® CPU chip and the Intel® CPU chip adjust the CPU power consumption differently, and need to be distinguished. If the chip platform type of the CPU is AMD® (also referred to as a first type), the process goes to step S318. If the chip platform type of the CPU is Intel® (also referred to as a second type), the process goes to step S325.

S318. The chip policy combiner sends the CPU power consumption scheduling policy 2 to the scheduling executor.

The CPU power consumption scheduling policy 2 includes PL1', PL2', and EPP'.

S319. The scheduling executor sends an instruction 3 to the OS2SOC driver node.

The instruction 3 carries PL1' and PL2'. To be specific, the instruction 3 is used for adjusting the PL1 and PL2 of the CPU. The instruction 3 is also referred to as a third instruction.

policy table based on the parameters (PL1', PL2', and EPP') in the scheduling policy, as shown in the Table 4.

The DTT policy number may be used for identifying a DTT policy (also referred to as a second sub-policy). The DTT policy corresponding to the DTT policy number is used for adjusting PL1_MINI, PL1_MAX, PL2, PL2_TIME, and EPO Gear of the CPU. PL1_MINI is a minimum value of PL1. PL1_MAX is a maximum value of PL1. PL2_TIME is a duration of PL2. The energy performance optimization gear (Energy Performance Optimize Gear, EPO Gear) represents the intensity of adjusting the CPU energy efficiency preference (EPP) value by the DTT, and ranges from 1 to 5. When the value of the EPO gear is larger, higher energy efficiency is achieved by adjusting the EPP value. When the value of the EPO gear is smaller, higher performance is achieved by adjusting EPP value.

TABLE 4

| CPU power consumption scheduling policy 2 | | | DTT policy | | | | | EPO |
|---|---|---|---|---|---|---|---|---|
| PL1' | PL2' | EPP' | number | PL1_MINI | PL1_MAX | PL2 | PL2_TIME | Gear |
| −1 | −1 | −1 | 0 | 30 | 40 | 95 | 28 | 3 |
| 14 | 32 | 153 | 1 | 16 | 36 | 32 | 4 | 4 |
| 8 | 25 | 230 | 2 | 8 | 28 | 25 | 2 | 4 |
| . . . | . . . | . . . | . . . | . . . | . . . | . . . | . . . | . . . |

In an optional embodiment, the CPU power consumption scheduling interface of the scheduling executor may send the instruction 3 to the OS2SOC driver node.

S320. The OS2SOC driver node sends the instruction 3 to the CPU.

S321. The CPU adjusts the PL1 and PL2 in response to the instruction 3.

To be specific, the CPU may adjust PL1 to PL1', and adjust PL2 to PL2'.

S322. The scheduling executor sends an instruction 4 to the power manager.

The instruction 4 carries an EPP' value. To be specific, the instruction 4 is used for adjusting the EPP value of the CPU. The instruction 4 is also referred to as a fourth instruction.

S323. The power manager sends the instruction 4 to the CPU.

S324. The CPU adjusts the EPP value in response to the instruction 4.

To be specific, the CPU may adjust EPP to EPP'.

S325. The chip policy combiner determines a dynamic tuning technology policy number based on the CPU power consumption scheduling policy 2.

The dynamic tuning technology (dynamic tuning technology, DTT) is a technology developed by Intel® to automatically and dynamically allocate power consumption between an Intel® processor and an Intel® discrete graphics card to optimize performance and extend battery endurance, thereby enhancing the performance of both the CPU and the GPU and intelligently balancing the power consumption of different workloads.

Understandably, a mapping relationship may exist between the DTT policy number and the CPU power consumption scheduling policy 2. A DTT policy table is created in the BIOS. Any CPU power consumption scheduling policy 2 can be mapped to a DTT policy number in the DTT It is to be noted that Table 4 shows the correspondences between only some parameters (PL1', PL2', and EPP') and the DTT policy numbers. In practical applications, the mapping table may include more information than that shown in Table 4. For example, if the CPU power consumption scheduling policy 2 indicates that PL1' is −1, PL2' is −1, and EPP' is −1, then it can be determined that the DTT policy number is 0, and correspondingly, PL1_MINI is 30, PL1_MAX is 40, PL2 is 95, PL2_TIME is 28, and EPO Gear is 3.

S326. The chip policy combiner sends the DTT policy number to the scheduling executor.

In an optional embodiment, the chip policy combiner may, instead, directly send the DTT policy (that is, the second sub-policy) corresponding to the DTT policy number to the scheduling executor.

S327. The scheduling executor sends the DTT policy number to the Intel DTT driver.

S328. The Intel DTT driver sends the DTT policy number to the CPU.

Understandably, the Intel DTT driver may send the DTT policy number to the CPU through the BIOS.

S329. The CPU runs based on the DTT policy number.

Evidently, if the chip platform type of the CPU is AMD®, the chip policy combiner may send an EPP adjustment instruction to the power manager through the scheduling executor. The power manager may adjust the EPP value of the CPU. In addition, the scheduling executor may send a PL1 and PL2 adjustment instruction to the OS2SOC driver node, so that the OS2SOC driver node drives the PL1 and PL2 of the CPU.

If the chip platform type of the CPU is Intel®, the chip policy combiner may determine the CPU power consumption scheduling policy 2 to obtain a DTT policy number, and send the DTT policy number to the Intel DTT driver through the scheduling executor by use of the BIOS, so that the CPU runs based on the DTT policy number, thereby achieving the effect of power consumption adjustment.

Understandably, according to this application, a kernel layer may obtain a focused window change event and first information (including process information of a focused process, status of occupying the GPU by the focused process, a peripheral event, a power mode, and the like); and an application layer may determine the current user scenario of the electronic device based on the focused window change event and the first information, and determine a first scheduling policy based on the user scenario and the system load of the electronic device. The application layer adjusts a process priority, an I/O priority, and CPU power consumption of the focused process based on the first scheduling policy, thereby reducing the energy consumption of the electronic device while smoothly meeting user requirements (ensuring smooth running of the focused process).

An embodiment of this application further provides an electronic device. The electronic device includes a memory and one or more processors.

The memory is configured to store computer program code, the computer program code includes a computer instruction, and, when executed by the processor, the computer instruction causes the electronic device to perform the functions or steps in the foregoing method embodiment. A structure of the electronic device may refer to the structure of the electronic device 100 in FIG. 1.

Figure 8:
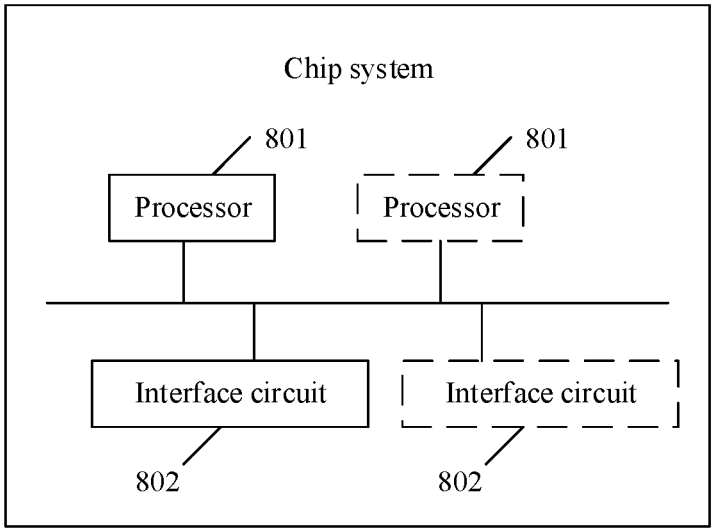
FIG. 8 is a schematic structural diagram of a chip according to an embodiment of this application.

An embodiment of this application further provides a chip system. As shown in FIG. 8, the chip system includes at least one processor 801 and at least one interface circuit 802. The processor 801 and the interface circuit 802 may be connected through a line. In an example, the interface circuit 802 may be configured to receive a signal from another apparatus (for example, a memory of the electronic device). For another example, the interface circuit 802 may be configured to transmit a signal to another apparatus (for example, the processor 801). For example, the interface circuit 802 may read the instructions stored in the memory, and send the instructions to the processor 801. When the instructions are executed by the processor 801, the electronic device may be enabled to perform steps in the foregoing embodiments. Certainly, the chip system may further include other discrete devices. This is not specifically limited in embodiments of this application.

An embodiment of this application further provides a computer storage medium, where the computer storage medium includes computer instructions. When the computer instructions are run on the foregoing electronic device, the electronic device is enabled to execute the functions or steps that are executed by the mobile phone in the foregoing method embodiments.

An embodiment of this application further provides a computer program product, where when the computer program product runs on a computer, the computer is enabled to perform each function or step performed by the mobile phone in the foregoing method embodiment.

It may be understood that to achieve the foregoing functions, the electronic device provided in the embodiments of this application includes corresponding hardware structures and/or software modules for performing the functions. A person skilled in the art should be easily aware that, in combination with units and algorithm steps of the examples described in the embodiments disclosed in this specification, the embodiments of this application can be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of embodiments of this application.

In embodiments of this application, the electronic device may be divided into functional modules based on the foregoing method examples, for example, each functional module may be obtained through division for each corresponding function, or two or more functions may be integrated into one processing module. The integrated module may be implemented in a form of hardware or may be implemented in a form of a software functional module. It should be noted that division into the modules in embodiments of this application is an example, and is merely logical function division. In actual implementation, there may be another division manner.

It may be clearly learned by a person skilled in the art from the foregoing descriptions of the implementations that, for convenience and brevity of description, division into only the foregoing function modules is used as an example for description. In actual application, the foregoing functions may be allocated to different function modules for implementation according to a requirement, that is, an internal structure of an apparatus is divided into different function modules, to complete all or some of the functions described above.

In the several embodiments provided in this application, it should be understood that the disclosed apparatus and method may be implemented in other manners. For example, the described apparatus embodiment is merely an example. For example, the described apparatus embodiment is only an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. Indirect couplings or communication connections between the apparatuses or units may be implemented in electronic, mechanical, or other forms.

The units described as separate parts may or may not be physically separated. A part displayed as a unit may be one physical unit or a plurality of physical units, located at the one position, or may be distributed to different positions. Some or all of the units may be selected according to actual requirements to achieve the purpose of the solutions in the embodiments.

In addition, functional units in embodiments of this application may be integrated into one processing unit, each of the units may exist alone physically, or two or more units may be integrated into one unit. The integrated module may be implemented in a form of hardware or may be implemented in a form of a software functional module.

When the integrated unit is implemented in the form of a software function unit and is sold or used as an independent product, the integrated unit may be stored in a readable storage medium. Based on such an understanding, the technical solutions in the embodiments of this application essentially, or the part contributing to the prior art, or all or a part of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, a compact disc, or the like.

The foregoing content is merely specific implementations of this application, but is not intended to limit the protection scope of this application. Any variation or replacement within the technical scope disclosed in this application shall fall within the protection scope of this application. Therefore, the protection scope of this application is subject to the protection scope of the claims.

What is claimed is:

1. A method, applicable to an electronic device, wherein the electronic device comprises a graphics processing unit (GPU) and a central processing unit (CPU), and the method comprises:

displaying, by the electronic device, a first window in response to a first operation of a user, wherein the first window corresponds to a first process; and adjusting a process priority and an input/output (I/O) priority of the first process and power consumption of the CPU comprising:

adjusting a process priority and an input/output (I/O) priority of the first process and power consumption of the CPU based on a first scheduling policy when a type of the first process is video, a GPU usage of the first process is greater than 0, a GPU engine is a GPU video process engine, and a system load is a first load; and adjusting the process priority and the I/O priority of the first process and the power consumption of the CPU based on a second scheduling policy when the type of the first process is video, the GPU usage of the first process is greater than o, a GPU engine is a GPU 3D engine, and the system load is the first load, wherein the first scheduling policy is different from the second scheduling policy.

2. The method according to claim 1, wherein adjusting the process priority and the I/O priority of the first process and the power consumption of the CPU comprises:

adjusting the process priority and the I/O priority of the first process and the power consumption of the CPU based on a third scheduling policy when the type of the first process is game, a power mode is a game mode, the GPU usage of the first process is greater than o, the GPU engine is the GPU 3D engine, and the system load is the first load.

3. The method according to claim 1, wherein adjusting the process priority and the I/O priority of the first process and the power consumption of the CPU comprises:

adjusting the process priority and the I/O priority of the first process and the power consumption of the CPU based on a fourth scheduling policy when the type of the first process is social, a keyboard input event is detected, and the system load is the first load;

adjusting the process priority and the I/O priority of the first process and the power consumption of the CPU based on a fifth scheduling policy when the type of the first process is social, a microphone input event is detected, a camera input event is not detected, and the system load is the first load; and adjusting the process priority and the I/O priority of the first process and the power consumption of the CPU based on a sixth scheduling policy when the type of the first process is social, the microphone input event and the camera input event are detected, and the system load is the first load, wherein the fourth scheduling policy, the fifth scheduling policy, and the sixth scheduling policy are different.

4. The method according to claim 1, wherein adjusting the process priority and the I/O priority of the first process and the power consumption of the CPU comprises:

adjusting the process priority and the I/O priority of the first process and the power consumption of the CPU based on a seventh scheduling policy when the type of the first process is office, a keyboard input event is detected, and the system load is the first load;

adjusting the process priority and the I/O priority of the first process and the power consumption of the CPU based on an eighth scheduling policy when the type of the first process is office, a mouse input event is detected, the keyboard input event is not detected, and the system load is the first load; and adjusting a process priority and an I/O priority of the first process and power consumption of the CPU based on a ninth scheduling policy when the type of the first process is office, a microphone input event and a camera input event are detected, and the system load is the first load, wherein the seventh scheduling policy, the eighth scheduling policy, and the ninth scheduling policy are different.

5. The method according to claim 1, wherein adjusting the process priority and the I/O priority of the first process and the power consumption of the CPU comprises:

adjusting a process priority and an I/O priority of the first process and power consumption of the CPU based on a first scheduling sub-policy when the type of the first process is video, the GPU usage of the first process is greater than o, the GPU engine is a GPU video process engine, and the system load is a second load, wherein the first scheduling policy comprises a first process priority, a first I/O priority of the first process, a first long-duration turbo boost power limit (PL1), a first short-duration turbo boost power limit PL2, and a first energy efficiency preference (EPP) value of the CPU, the first scheduling sub-policy comprises a second process priority, a second I/O priority of the first process, a second PL1, a second PL2, and a second EPP value of the CPU, the second load is greater than the first load, the second process priority is higher than or equal to the first process priority, the second I/O priority is higher than or equal to the first I/O priority, the second PL1 is greater than the first PL1, the second PL2 is greater than the first PL1, and the second EPP value is less than the first EPP value; or adjusting the process priority and the I/O priority of the first process and the power consumption of the CPU based on a second scheduling sub-policy when the type of the first process is video, the GPU usage of the first process is greater than o, the GPU engine is the GPU 3D engine, and the system load is the second load, wherein the second scheduling policy comprises a third process priority, a third I/O priority of the first process, a third PL1, a third PL2, and a third EPP value of the CPU, the second scheduling sub-policy comprises a fourth process priority, a fourth I/O priority of the first process, a fourth PL1, a fourth PL2, and a fourth EPP value of the CPU, the fourth process priority is higher than or equal to the third process priority, the fourth I/O priority is higher than or equal to the third I/O priority, the fourth PL1 is greater than the third PL1, the fourth PL2 is greater than the third PL2, and the fourth EPP value is less than the third EPP value.

6. The method according to claim 2, wherein adjusting the process priority and the I/O priority of the first process and the power consumption of the CPU comprises:

adjusting the process priority and the I/O priority of the first process and the power consumption of the CPU based on a third scheduling sub-policy when the type of the first process is game, the power mode is the game mode, the GPU usage of the first process is greater than o, the GPU engine is the GPU 3D engine, and the system load is a second load, wherein the third scheduling policy comprises a fifth process priority, a fifth I/O priority of the first process, a fifth turbo boost power limit (PL1), a fifth PL2, and a fifth energy efficiency preference (EPP) value of the CPU, the third scheduling sub-policy comprises a sixth process priority, a sixth I/O priority of the first process, a sixth PL1, a sixth PL2, and a sixth EPP value of the CPU, the second load is greater than the first load, the sixth process priority is higher than or equal to the fifth process priority, the sixth I/O priority is higher than or equal to the fifth I/O priority, the sixth PL1 is greater than the fifth PL1, the sixth PL2 is greater than the fifth PL2, and the sixth EPP value is less than the fifth EPP value.

7. The method according to claim 3, wherein adjusting the process priority and the I/O priority of the first process and the power consumption of the CPU comprises:

adjusting the process priority and the I/O priority of the first process and the power consumption of the CPU based on a fourth scheduling sub-policy when the type of the first process is social, the keyboard input event is detected, and the system load is a second load, wherein the fourth scheduling policy comprises a seventh process priority, a seventh I/O priority of the first process, a seventh turbo boost power limit (PL1), a seventh PL2, and a seventh EPP value of the CPU, the fourth scheduling sub-policy comprises an eighth process priority, an eighth I/O priority of the first process, an eighth PL1, an eighth PL2, and an eighth energy efficiency preference (EPP) value of the CPU, the second load is greater than the first load, the eighth process priority is higher than or equal to the seventh process priority, the eighth I/O priority is higher than or equal to the seventh I/O priority, the eighth PL1 is greater than the seventh PL1, the eighth PL2 is greater than the seventh PL2, and the eighth EPP value is less than the seventh EPP value; or adjusting the process priority and the I/O priority of the first process and the power consumption of the CPU based on a fifth scheduling sub-policy when the type of the first process is social, the microphone input event is detected, the camera input event is not detected, and the system load is the second load, wherein the fifth scheduling policy comprises a ninth process priority, a ninth I/O priority of the first process, a ninth PL1, a ninth PL2, and a ninth EPP value of the CPU, the fifth scheduling sub-policy comprises a tenth process priority, a tenth I/O priority of the first process, a tenth PL1, a tenth PL2, and a tenth EPP value of the CPU, the tenth process priority is higher than or equal to the ninth process priority, the tenth I/O priority is higher than or equal to the ninth I/O priority, the tenth PL1 is greater than the ninth PL1, the tenth PL2 is greater than the ninth PL2, and the tenth EPP value is less than the ninth EPP value; or adjusting the process priority and the I/O priority of the first process and the power consumption of the CPU based on a sixth scheduling sub-policy when the type of the first process is social, the microphone input event and the camera input event are detected, and the system load is the second load, wherein the sixth scheduling policy comprises an eleventh process priority, an eleventh I/O priority of the first process, an eleventh PL1, an eleventh PL2, and an eleventh EPP value of the CPU, the sixth scheduling sub-policy comprises a twelfth process priority, a twelfth I/O priority of the first process, a twelfth PL1, a twelfth PL2, and a twelfth EPP value of the CPU, the twelfth process priority is higher than or equal to the eleventh process priority, the twelfth I/O priority is higher than or equal to the eleventh I/O priority, the twelfth PL1 is greater than the eleventh PL1, the twelfth PL2 is greater than the eleventh PL2, and the twelfth EPP value is less than the eleventh EPP value.

8. The method according to claim 4, wherein adjusting the process priority and the I/O priority of the first process and the power consumption of the CPU comprises:

adjusting the process priority and the I/O priority of the first process and the power consumption of the CPU based on a seventh scheduling sub-policy when the type of the first process is office, the keyboard input event is detected, and the system load is a second load, wherein the seventh scheduling policy comprises a thirteenth process priority, a thirteenth I/O priority of the first process, and a thirteenth turbo boost power limit (PL1), a thirteenth PL2, and a thirteenth energy efficiency preference (EPP) value of the CPU, the seventh scheduling sub-policy comprises a fourteenth process priority and a fourteenth I/O priority of the first process, and a fourteenth PL1, a fourteenth PL2, and a fourteenth EPP value of the CPU, the second load is greater than the first load, the fourteenth process priority is higher than or equal to the thirteenth process priority, the fourteenth I/O priority is higher than or equal to the thirteenth I/O priority, the fourteenth PL1 is greater than the thirteenth PL1, the fourteenth PL2 is greater than the thirteenth PL2, and the fourteenth EPP value is less than the thirteenth EPP value; or adjusting the process priority and the I/O priority of the first process and the power consumption of the CPU based on an eighth scheduling sub-policy when the type of the first process is office, the mouse input event is detected, the keyboard input event is not detected, and the system load is the second load, wherein the eighth scheduling policy comprises a fifteenth process priority and a fifteenth I/O priority of the first process, and a fifteenth PL1, a fifteenth PL2, and a fifteenth EPP value of the CPU, the eighth scheduling sub-policy comprises a sixteenth process priority and a sixteenth I/O priority of the first process, and a sixteenth PL1, a sixteenth PL2, and a sixteenth EPP value of the CPU, the sixteenth process priority is higher than or equal to the fifteenth process priority, the sixteenth I/O priority is higher than or equal to the fifteenth I/O priority, the sixteenth PL1 is greater than the fifteenth PL1, the sixteenth PL2 is greater than the fifteenth PL2, and the sixteenth EPP value is less than the fifteenth EPP value; or

adjusting the process priority and the I/O priority of the first process and the power consumption of the CPU based on a ninth scheduling sub-policy when the type of the first process is office, the microphone input event and the camera input event are detected, and the system load is the second load, wherein the ninth scheduling policy comprises a seventeenth process priority and a seventeenth I/O priority of the first process, and a seventeenth PL1, a seventeenth PL2, and a seventeenth EPP value of the CPU, the ninth scheduling sub-policy comprises an eighteenth process priority and an eighteenth I/O priority of the first process, and an eighteenth PL1, an eighteenth PL2, and an eighteenth EPP value of the CPU, the eighteenth process priority is higher than or equal to the seventeenth process priority, the eighteenth I/O priority is higher than or equal to the seventeenth I/O priority, the eighteenth PL1 is greater than the seventeenth PL1, the eighteenth PL2 is greater than the seventeenth PL2, and the eighteenth EPP value is less than the seventeenth EPP value.

9. The method according to claim 8, wherein adjusting the power consumption of the CPU based on the first scheduling policy or the second scheduling policy comprises:

adjusting the power consumption of the CPU based on a first sub-policy carried in the first scheduling policy or the second scheduling policy when a chip platform of the CPU is a first type; and adjusting the power consumption of the CPU based on a second sub-policy carried in the first scheduling policy or the second scheduling policy when the chip platform of the CPU is a second type, wherein the second sub-policy is a Dynamic Tuning Technology (DTT) policy determined based on the first sub-policy.

10. The method according to claim 1, further comprising:

obtaining process information of the first process and first information, wherein the first information comprises at least one of: GPU usage information of the first process, a peripheral event, or power mode information, and the GPU usage information comprises a GPU usage of the first process and a GPU engine.

11. The method according to claim 10, further comprising:

determining a user scenario of the electronic device based on the process information of the first process and the first information;

obtaining a system load of the electronic device;

obtaining a scheduling policy based on the system load and the user scenario, wherein the scheduling policy comprises an operating system (OS) scheduling policy and a CPU power consumption scheduling policy;

adjusting a process priority and an input/output I/O priority of the first process based on the OS scheduling policy; and adjusting power consumption of the CPU based on the CPU power consumption scheduling policy.

12. The method according to claim 1, wherein the electronic device further comprises a scenario recognition engine, an operating system event driver OsEventDriver node, and a process manager, and the method further comprises:

sending, by the scenario recognition engine, a first request to the OsEventDriver node;

sending, by the OsEventDriver node, the first request to the process manager;

38 sending, by the process manager, process information of a second process to the OsEventDriver node in response to the first request after creating the second process; and sending, by the OsEventDriver node, the process information of the second process to the scenario recognition engine.

13. The method according to claim 1, wherein the electronic device further comprises a scenario recognition engine and an application programming interface (API) module, and the method further comprises:

sending, by the scenario recognition engine, a second request to the API module; and sending, by the API module, the process information of the first process to the scenario recognition engine in response to the second request after detecting a change of a focused window.

14. The method according to claim 1, wherein the electronic device further comprises a scenario recognition engine, an OsEventDriver node, and a graphics card driver, and the method further comprises:

sending, by the scenario recognition engine, a third request to the OsEventDriver node;

sending, by the OsEventDriver node, the third request to the graphics card driver;

reporting, by the graphics card driver, a GPU decoding event to the OsEventDriver node in response to the third request after detecting that the GPU is performing a decoding operation; and sending, by the OsEventDriver node, the GPU decoding event to the scenario recognition engine.

15. The method according to claim 1, wherein the electronic device further comprises a scenario recognition engine, an OsEventDriver node, and a peripheral driver, and the method further comprises:

sending, by the scenario recognition engine, a fourth request to the OsEventDriver node;

sending, by the OsEventDriver node, the fourth request to the peripheral driver;

reporting, by the peripheral driver, a peripheral event to the OsEventDriver node in response to the fourth request after detecting a peripheral operation; and sending, by the OsEventDriver node, the peripheral event to the scenario recognition engine.

16. The method according to claim 13, further comprising:

obtaining, by the API module, a name of the first process and a name of a second process in response to a first operation of a user, wherein the second process is a process corresponding to a historical focused window; and sending the process information of the first process to the scenario recognition engine when the name of the first process is inconsistent with the name of the second process.

17. An electronic device, comprising a memory and one or more processors, wherein the memory is configured to store computer program code, the computer program code comprises a computer instruction, and when executed by the processor, the computer instruction causes the electronic device to perform the following operations:

displaying a first window in response to a first operation of a user, wherein the first window corresponds to a first process; and adjusting a process priority and an input/output (I/O) priority of the first process and power consumption of the CPU comprising:

adjusting a process priority and an input/output (I/O) priority of the first process and power consumption of a CPU based on a first scheduling policy when a type of the first process is video, a GPU usage of the first process is greater than o, a GPU engine is a GPU video process engine, and a system load is a first load; and adjusting the process priority and the I/O priority of the first process and the power consumption of the CPU based on a second scheduling policy when the type of the first process is video, the GPU usage of the first process is greater than o, a GPU engine is a GPU 3D engine, and the system load is the first load, wherein the first scheduling policy is different from the second scheduling policy.

18. A non-transitory computer-readable storage medium, comprising a computer instruction, wherein when run on an electronic device, the computer instruction causes the electronic device to perform the following operations:

displaying a first window in response to a first operation of a user, wherein the first window corresponds to a first process; and adjusting a process priority and an input/output (I/O) priority of the first process and power consumption of the CPU comprising:

adjusting a process priority and an input/output (I/O) priority of the first process and power consumption of a CPU based on a first scheduling policy when a type of the first process is video, a GPU usage of the first process is greater than o, a GPU engine is a GPU video process engine, and a system load is a first load; and adjusting the process priority and the I/O priority of the first process and the power consumption of the CPU based on a second scheduling policy when the type of the first process is video, the GPU usage of the first process is greater than o, a GPU engine is a GPU 3D engine, and the system load is the first load, wherein the first scheduling policy is different from the second scheduling policy.

\* \* \* \* \*